(12) United States Patent
Jubert

(10) Patent No.: US 8,213,119 B2
(45) Date of Patent: Jul. 3, 2012

(54) WRITING AND READING MULTI-LEVEL PATTERNED MAGNETIC RECORDING MEDIA

(75) Inventor: Pierre-Olivier Jubert, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/028,582

(22) Filed: Feb. 16, 2011

(65) Prior Publication Data

US 2011/0134560 A1  Jun. 9, 2011

Related U.S. Application Data

(62) Division of application No. 12/237,431, filed on Sep. 25, 2008, now Pat. No. 7,911,739.

(51) Int. Cl.
    *G11B 5/66* (2006.01)
(52) U.S. Cl. .................. 360/135; 428/827; 428/828
(58) Field of Classification Search .................. 360/55, 360/131, 134, 135; 428/826, 827, 828, 828.1; 427/127
    See application file for complete search history.

(56) References Cited

U.S. PATENT DOCUMENTS

| | | | |
|---|---|---|---|
| 4,151,602 A | 4/1979 | Haisma et al. | |
| 4,157,576 A | 6/1979 | Hack et al. | |
| 4,520,076 A | 5/1985 | Saito et al. | |
| 5,319,481 A | 6/1994 | Fergason | |
| 5,319,501 A | 6/1994 | Mitsuhashi | |
| 5,331,728 A | 7/1994 | Argyle et al. | |
| 5,347,408 A | 9/1994 | Gohda et al. | |
| 5,388,019 A | 2/1995 | Argyle et al. | |
| 5,453,886 A | 9/1995 | Kobayashi et al. | |
| 5,635,835 A | 6/1997 | Mouchot et al. | |
| 5,851,643 A | 12/1998 | Honda et al. | |
| 5,869,963 A | 2/1999 | Saito et al. | |
| 5,912,783 A | 6/1999 | Ishida et al. | |
| 5,958,541 A | 9/1999 | Miller et al. | |
| 6,153,062 A | 11/2000 | Saito et al. | |
| 6,322,933 B1 | 11/2001 | Daiber et al. | |
| 6,352,621 B1 | 3/2002 | Saito et al. | |

(Continued)

FOREIGN PATENT DOCUMENTS

JP 03272453 A 12/1991

(Continued)

OTHER PUBLICATIONS

Notice of Allowance (Mail Date Nov. 15, 2010) for U.S. Appl. No. 12/237,431, filed Sep. 25, 2008; Confirmation No. 9785.

(Continued)

*Primary Examiner* — Will J Klimowicz
(74) *Attorney, Agent, or Firm* — Schmeiser, Olsen & Watts

(57) ABSTRACT

A method and system for reading readback waveforms representing written magnetization states of a pair of magnetic islands of a two-level patterned magnetic recording medium, and a structure that include a multi-level patterned magnetic medium. Reading the readback waveform representing the written magnetization state includes: identifying the written magnetization state by decoding the readback waveform; and displaying and/or recording the written magnetization state. The magnetic medium of the structure includes distributed pillars. Each pillar includes a first and second magnetic island. Each magnetic island has a magnetic easy axis oriented at a first tilt angle ($\alpha_1$) and a second tilt angle ($\alpha_2$), wherein $\alpha_1$ and $\alpha_2$ satisfy: $\alpha_1 \neq \alpha_2$, either or both of $\alpha_1$ and $\alpha_2$ differing from 0, 90, 180, and 270 degrees, or combinations thereof.

19 Claims, 23 Drawing Sheets

U.S. PATENT DOCUMENTS

| | | |
|---|---|---|
| 6,391,430 B1 | 5/2002 | Fullerton et al. |
| 6,594,120 B2 | 7/2003 | Odagawa et al. |
| 6,610,602 B2 | 8/2003 | Gambino et al. |
| 6,620,532 B2 | 9/2003 | Aoyama |
| 6,865,044 B1 | 3/2005 | Albrecht et al. |
| 6,882,488 B1 | 4/2005 | Albrecht et al. |
| 6,906,879 B1 | 6/2005 | Albrecht et al. |
| 6,947,235 B2 | 9/2005 | Albrecht et al. |
| 7,060,393 B2 | 6/2006 | Tsukamoto et al. |
| 7,171,080 B2 | 1/2007 | Rausch |
| 7,271,984 B2 | 9/2007 | Umeda et al. |
| 7,282,278 B1 | 10/2007 | Nolan |
| 7,355,884 B2 | 4/2008 | Nakayama et al. |
| 7,477,490 B2 | 1/2009 | Gao et al. |
| 7,518,907 B2 | 4/2009 | Nakayama et al. |
| 7,911,739 B2 | 3/2011 | Jubert |
| 2005/0053803 A1 | 3/2005 | Umeda et al. |
| 2005/0084715 A1 | 4/2005 | Hee et al. |
| 2005/0122609 A1* | 6/2005 | Albrecht et al. ............... 360/55 |
| 2006/0177702 A1* | 8/2006 | Ajan ....................... 428/828.1 |
| 2006/0222896 A1 | 10/2006 | Inomata et al. |
| 2006/0249391 A1 | 11/2006 | Jin |
| 2007/0218317 A1 | 9/2007 | Kurita et al. |
| 2008/0002296 A1 | 1/2008 | Umeda et al. |
| 2008/0063901 A1 | 3/2008 | Nakayama et al. |
| 2008/0085424 A1* | 4/2008 | Dobin et al. ................. 428/826 |
| 2008/0226817 A1 | 9/2008 | Lee |
| 2009/0080109 A1 | 3/2009 | Fukuzawa et al. |
| 2009/0140358 A1 | 6/2009 | Nakayama et al. |
| 2009/0154219 A1 | 6/2009 | Hellwig et al. |
| 2010/0020437 A1* | 1/2010 | Dobin et al. .................... 360/86 |
| 2010/0053811 A1 | 3/2010 | Takeshita |
| 2010/0073814 A1 | 3/2010 | Jubert |
| 2010/0075178 A1 | 3/2010 | Jubert |
| 2011/0109984 A1* | 5/2011 | Jubert ........................... 360/67 |

FOREIGN PATENT DOCUMENTS

| | | | |
|---|---|---|---|
| JP | 11328645 A | 11/1999 | |

OTHER PUBLICATIONS

U.S. Appl. No. 12/236,589, filed Sep. 24, 2008; First Named Inventor Pierre-Olivier Jubert; Confirmation No. 8200.

U.S. Appl. No. 12/615,375, filed Nov. 10, 2009; First Named Inventor Pierre-Olivier Jubert; Confirmation No. 1466.

U.S. Appl. No. 12/615,290, filed Nov. 10, 2009; First Named Inventor Pierre-Olivier Jubert; Confirmation No. 1308.

Restriction Requirement (Mail Date May 7, 2010) for U.S. Appl. No. 12/237,431, filed Sep. 25, 2008; Confirmation No. 9785.

Jun. 4, 2010 filed Response to Restriction w/Preliminary Amendment for U.S. Appl. No. 12/237,431, filed Sep. 25, 2008; Confirmation No. 9785.

Office Action (Mail Date Jun. 25, 2010) for U.S. Appl. No. 12/237,431, filed Sep. 25, 2008; Confirmation No. 9785.

Sep. 23, 2010 filed Response to Office Action for U.S. Appl. No. 12/237,431, filed Sep. 25, 2008; Confirmation No. 9785.

Restriction Requirement (Mail Date May 10, 2010) for U.S. Appl. No. 12/236,589, filed Sep. 24, 2008; Confirmation No. 8200.

Jun. 4, 2010 filed Response to Restriction w/Preliminary Amendment for U.S. Appl. No. 12/236,589, filed Sep. 24, 2008; Confirmation No. 8200.

Office Action (Mail Date Jul. 9, 2010) for U.S. Appl. No. 12/236,589, filed Sep. 24, 2008; Confirmation No. 8200.

Oct. 12, 2010 filed Response to Office Action for U.S. Appl. No. 12/236,589, filed Sep. 24, 2008; Confirmation No. 8200.

Final Office Action (Mail Date Nov. 29, 2010) for U.S. Appl. No. 12/236,589, filed Sep. 24, 2008; Confirmation No. 8200.

Jan. 31, 2011 filed Response to Final Office Action for U.S. Appl. No. 12/236,589, filed Sep. 24, 2008; Confirmation No. 8200.

USPTO Office Action (Mail Date Feb. 24, 2011) for U.S. Appl. No. 12/615,375, filed Nov. 10, 2009; Confirmation No. 1466.

USPTO Office Action (Mail Date Feb. 24, 2011) for U.S. Appl. No. 12/615,290, filed Nov. 10, 2009; Confirmation No. 1308.

Notice of Allowance (Mail Date May 31, 2011) for U.S. Appl. No. 12/615,375, filed Nov. 10, 2009; Confirmation No. 1466.

Office Action (Mail Date Apr. 4, 2011) for U.S. Appl. No. 12/236,589, filed Sep. 24, 2008; Confirmation No. 8200.

* cited by examiner

WRITING AND READING MULTI-LEVEL PATTERNED MAGNETIC RECORDING MEDIA

This application is a divisional application claiming priority to Ser. No. 12/237,431, filed Sep. 25, 2008, now U.S. Pat. No. 7,911,739 issued Mar. 22, 2011.

FIELD OF THE INVENTION

The present invention relates to writing and reading multi-level patterned magnetic recording media.

BACKGROUND OF THE INVENTION

Patterned magnetic recording media are under consideration for being used for recording bits of data thereon. A patterned medium for magnetic recording comprises isolated islands such that the magnetization is uniform in each island. A patterned recording medium may be formed by patterning a thin-film layer. With conventional magnetic recording, however, there are limitations on the achievable recording density and on the efficiency of writing bits of data on the patterned magnetic recording media.

SUMMARY OF THE INVENTION

The present invention provides a method for writing magnetization states in a multi-level patterned magnetic medium comprising a plurality of pillars distributed in an X direction and a Y direction which are orthogonal to each other and define an X-Y plane, consecutive pillars of the plurality of pillars separated by non-magnetic material, each pillar comprising a plurality of magnetic islands distributed along a Z direction orthogonal to the X-Y plane, said method comprising:

selecting a magnetization state [S1; S2] comprising a magnetic state (S1) and a magnetic state (S2) in a first magnetic island and in a second magnetic island, respectively, of the plurality of magnetic islands of a first pillar of the plurality of pillars, wherein $\alpha_1^*$ and $\alpha_2^*$ are a first tilt angle and a second tilt angle at which a hard axis of the first magnetic island and the second magnetic island are respectively oriented with respect to the X direction, and wherein either or both of $\alpha_1^*$ and $\alpha_2^*$ are in a range of 0 to −90 degrees;

determining a write current (I) sufficient to write the magnetization state [S1; S2];

applying the write current I to a magnetic write head moving in the X direction to generate in the first magnetic island and the second magnetic island a magnetic field that exceeds a switching field of the first magnetic island and a switching field of the second magnetic island; and responsive to said applying, said magnetic write head writing the magnetization state [S1; S2] by simultaneously writing the magnetic state S1 in the first magnetic island and the magnetic state S2 in the second magnetic island.

The present invention provides a method for reading magnetization states from a two-level patterned magnetic medium comprising a plurality of pillars distributed in an X direction and a Y direction which are orthogonal to each other and define an X-Y plane, consecutive pillars of the plurality of pillars separated by non-magnetic material, each pillar comprising two magnetic islands distributed along a Z direction orthogonal to the X-Y plane, said method comprising:

reading, by a magnetic read head moving in the X direction, a readback waveform (W) specific to a magnetization state [S1; S2] comprising a magnetic state (S1) and a magnetic state (S2) in a first magnetic island and in a second magnetic island, respectively, of the two magnetic islands of a selected pillar of the plurality of pillars, wherein the first magnetic island and the second magnetic island have a magnetic easy axis respectively oriented at a first tilt angle ($\alpha_1$) and a second tilt angle ($\alpha_2$) with respect to the X direction, wherein $\alpha_1$ and $\alpha_2$ satisfy a condition selected from the group consisting of 1) $\alpha_1 \neq \alpha_2$, 2) either or both of $\alpha_1$ and $\alpha_2$ differing from 0, 90, 180, and 270 degrees, and 3) combinations thereof, and wherein the first magnetic island and the second magnetic island have a magnetic hard axis respectively oriented at a first tilt angle ($\alpha_1^*$) and a second tilt angle ($\alpha_2^*$) with respect to the X direction;

identifying the magnetization state [S1; S2] by decoding the readback waveform W resulting from said reading; and displaying and/or recording the magnetization state [S1; S2], wherein the magnetization state [S1; S2] is a state A=[+1,+1], a state B=[−1,−1], a state C=[+1,−1], or a state D=[−1,+1], wherein the magnetic state S1 is respectively +1 or −1 if a magnetization of the first magnetic island is oriented at or opposite to the angle $\alpha_1$, and wherein the magnetic state S2 is respectively +1 or −1 if a magnetization of the second magnetic island is oriented at or opposite to the angle $\alpha_2$.

The present invention provides a structure comprising a multi-level patterned magnetic medium comprising a plurality of pillars distributed in an X direction and a Y direction which are orthogonal to each other and define an X-Y plane, wherein consecutive pillars of the plurality of pillars are separated by non-magnetic material, wherein each pillar comprises N magnetic islands distributed along a Z direction orthogonal to the X-Y plane, wherein N is an integer of at least 2, wherein the N magnetic islands of a first pillar of the plurality of pillars comprise a first magnetic island and a second magnetic island, wherein the first magnetic island and the second magnetic island have a magnetic easy axis respectively oriented at a first tilt angle ($\alpha_1$) and a second tilt angle ($\alpha_2$) with respect to the X direction, wherein $\alpha_1$ and $\alpha_2$ satisfy a condition selected from the group consisting of $\alpha_1 \neq \alpha_2$, either or both of $\alpha_1$ and $\alpha_2$ differing from 0, 90, 180, and 270 degrees, and combinations thereof, and wherein the first magnetic island and the second magnetic island have a magnetic hard axis respectively oriented at a first tilt angle ($\alpha_1^*$) and a second tilt angle ($\alpha_2^*$) with respect to the X direction.

The present invention provides an apparatus comprising a computer program product, said computer program product comprising a computer readable storage medium having a computer readable program code embodied therein, said computer readable program code containing instructions that when executed by a processor of a computer system implement a method for writing magnetization states in a multi-level patterned magnetic medium comprising a plurality of pillars distributed in an X direction and a Y direction which are orthogonal to each other and define an X-Y plane, consecutive pillars of the plurality of pillars separated by non-magnetic material, each pillar comprising a plurality of magnetic islands distributed along a Z direction orthogonal to the X-Y plane, said method comprising:

selecting a magnetization state [S1; S2] comprising a magnetic state (S1) and a magnetic state (S2) in a first magnetic island and in a second magnetic island, respectively, of the plurality of magnetic islands of a first pillar of the plurality of pillars, wherein $\alpha_1^*$ and $\alpha_2^*$ are a first tilt angle and a second tilt angle at which a hard axis of the first magnetic island and the second magnetic island are respectively oriented with respect to the X direction, and wherein either or both of $\alpha_1^*$ and $\alpha_2^*$ are in a range of 0 to −90 degrees;

determining a write current (I) sufficient to write the magnetization state [S1; S2]; and issuing a command for applying the write current I to a magnetic write head moving in the X direction to generate in the first magnetic island and the second magnetic island a magnetic field that exceeds a switching field of the first magnetic island and a switching field of the second magnetic island, respectively, said command causing the magnetic write head to write the magnetization state [S1; S2] by simultaneously writing the magnetic state S1 in the first magnetic island and the magnetic state S2 in the second magnetic island.

The present invention provides an apparatus comprising a computer program product, said computer program product comprising a computer readable storage medium having a computer readable program code embodied therein, said computer readable program code containing instructions that when executed by a processor of a computer system implement a method for reading magnetization states from a multi-level patterned magnetic medium comprising a plurality of pillars distributed in an X direction and a Y direction which are orthogonal to each other and define an X-Y plane, consecutive pillars of the plurality of pillars separated by non-magnetic material, each pillar comprising two magnetic islands distributed along a Z direction orthogonal to the X-Y plane, said method comprising:

issuing a command for reading, by a magnetic read head moving in the X direction, a readback waveform (W) specific to a magnetization state [S1; S2] comprising a magnetic state (S1) and a magnetic state (S2) in a first magnetic island and in a second magnetic island, respectively, of the two islands of a selected pillar of the plurality of pillars, said command causing the magnetic write head to read the readback waveform W, wherein the first magnetic island and the second magnetic island have a magnetic easy axis respectively oriented at a first tilt angle ($\alpha_1$) and a second tilt angle ($\alpha_2$) with respect to the X direction, wherein $\alpha_1$ and $\alpha_2$ satisfy a condition selected from the group consisting of $\alpha_1 \neq \alpha_2$, either or both of $\alpha_1$ and $\alpha_2$ differing from 0, 90, 180, and 270 degrees, and combinations thereof, and wherein the first magnetic island and the second magnetic island have a magnetic hard axis respectively oriented at a first tilt angle ($\alpha_1^*$) and a second tilt angle ($\alpha_2^*$) with respect to the X direction;

identifying the magnetization state [S1; S2] by decoding the readback waveform W resulting from said reading; and displaying and/or recording the magnetization state [S1; S2], wherein the magnetization state [S1; S2] is a state A=[+1,+1], a state B=[−1,−1], a state C=[+1,−1], or a state D=[−1,+1], wherein the magnetic state S1 is respectively +1 or −1 if a magnetization of the first magnetic island is oriented at or opposite to the angle $\alpha_1$, and wherein the magnetic state S2 is respectively +1 or −1 if a magnetization of the second magnetic island is oriented at or opposite to the angle $\alpha_2$.

The present invention provides magnetic recording with a patterned recording medium that increases recording density for the patterned recording medium and improves the efficiency of writing bits of data on the patterned recording medium.

DETAILED DESCRIPTION OF THE INVENTION

The present invention provides a multi-level patterned magnetic recording medium comprising N levels (N≧2), a method for writing independent bits simultaneously at two levels of the medium thus reducing the writing steps for the two levels by a factor of 2. The present invention also provides a method for reading the information states stored in simultaneously written two levels of a two-level patterned magnetic recording medium. The method and system of the present invention is with respect to a two-level magnetic medium (i.e., N=2) or to a selected two levels of a magnetic medium comprising more than 2 levels (i.e., N>2).

Figure 1:
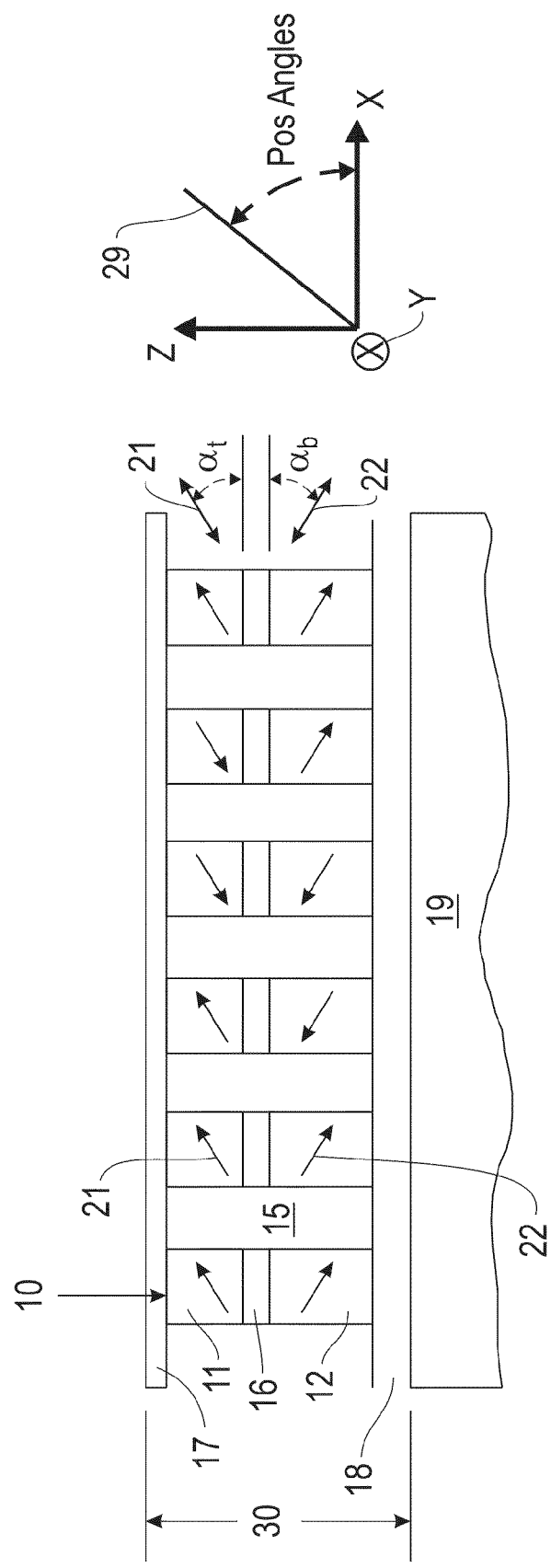
FIG. 1 is a schematic description of a patterned multi-level magnetic medium with 2 levels, in accordance with embodiments of the present invention.

FIG. 1 is a schematic description of a multi-level patterned magnetic medium 30 with 2 levels, in accordance with embodiments of the present invention. The magnetic medium 30 comprises a recording layer made of individual magnetic pillars 10 that are spaced apart in the X direction and in the Y direction by a non-magnetic material 15 such as, inter alia, $SiO_2$, $Al_2O_3$, etc. The X direction and the Y direction define an X-Y plane. In one embodiment, the magnetic islands in the pillars 10 are separated from each other in the Z direction which is orthogonal to the X-Y plane by a spacer layer 16. The X, Y, and Z directions are mutually orthogonal to one another and form a (X, Y, Z) right-handed rectangular coordinate system as shown in FIG. 1. In one embodiment, the spacer layer 16 does not exist and consecutive magnetic islands in each magnetic pillar 10 are not physically separated from each other but nonetheless behave independently. The magnetic medium 30 may include an overcoat 17 and an under-layer 18 between the recording layer and a substrate 19.

In one embodiment, the substrate 19 may comprise a material used in disk drives (e.g., conventional disk drives), including a material such as, inter alia, glass and AlMg. In one embodiment, the substrate 19 may comprise a semiconductor material such as, inter alia, silicon.

In one embodiment, the substrate 19 may be a plastic substrate (e.g., PET, PEN, Aramid) used for tape media.

In one embodiment, the under-layer 18 may include one or more materials that can be used as seeds and for promoting orientation of the magnetic layers and may include, inter alia, Ti, Cr, C, NiAl, CoCr, CoO, etc.

In one embodiment, the overcoat 17 may be, inter alia, a diamond-like carbon overcoat, a lubricant layer, etc.

Each magnetic pillar 10 comprises a top magnetic island 11 and a bottom magnetic island 12 which in one embodiment are isolated from each other in the Z direction by the spacer layer 16. In one embodiment, the spacer layer 16 comprises a non-magnetic spacer material such as, inter alia, Cu, Ag, Au, Ru, CoO, SiO, etc. In one embodiment, the spacer layer 16 comprises a ferromagnetic material that does not disturb the magnetic behavior of each top island 11 and bottom island 12 of the magnetic pillars 10. As indicated supra, in one embodiment, the spacer layer 16 does not exist and consecutive magnetic islands in each magnetic pillar 10 are not physically separated from each other but nonetheless behave independently.

Each top island 11 and bottom island 12 is a single-domain particle or an assembly of particles that behave as a single magnetic volume. The magnetic material of each top island 11 and each bottom island 12 may comprise, inter alia, thin film or particulate, made of Fe, Co, Ni, or made of an alloy containing at least one element among Fe, Co, Ni, Mn, Cr. Typical media materials are based on: Co alloys (e.g., CoPtCr, $CO_3Pt$); magnetic alloys with L10 phase (e.g., FePd, FePt, CoPt, MnAl), rare earth alloys (e.g., FeNdB, $SmCO_5$); oxides (e.g., $CrO_2$, $Fe_3O_4$, $(CoFe)_3O_4$, BaFeO).

FIG. 1 depicts an (X, Y, Z) rectangular coordinate system. In the forward direction, the magnetic head (see FIG. 6) is moving in the positive X direction. In the reverse direction, the magnetic head is moving in the negative X direction. Any line or vector, as represented by the line 29 in FIG. 1, makes a positive angle with the X axis as shown. Unless otherwise stated, all numerical values of angles appearing herein, including in the claims, are in units of degrees.

Figure 6A:
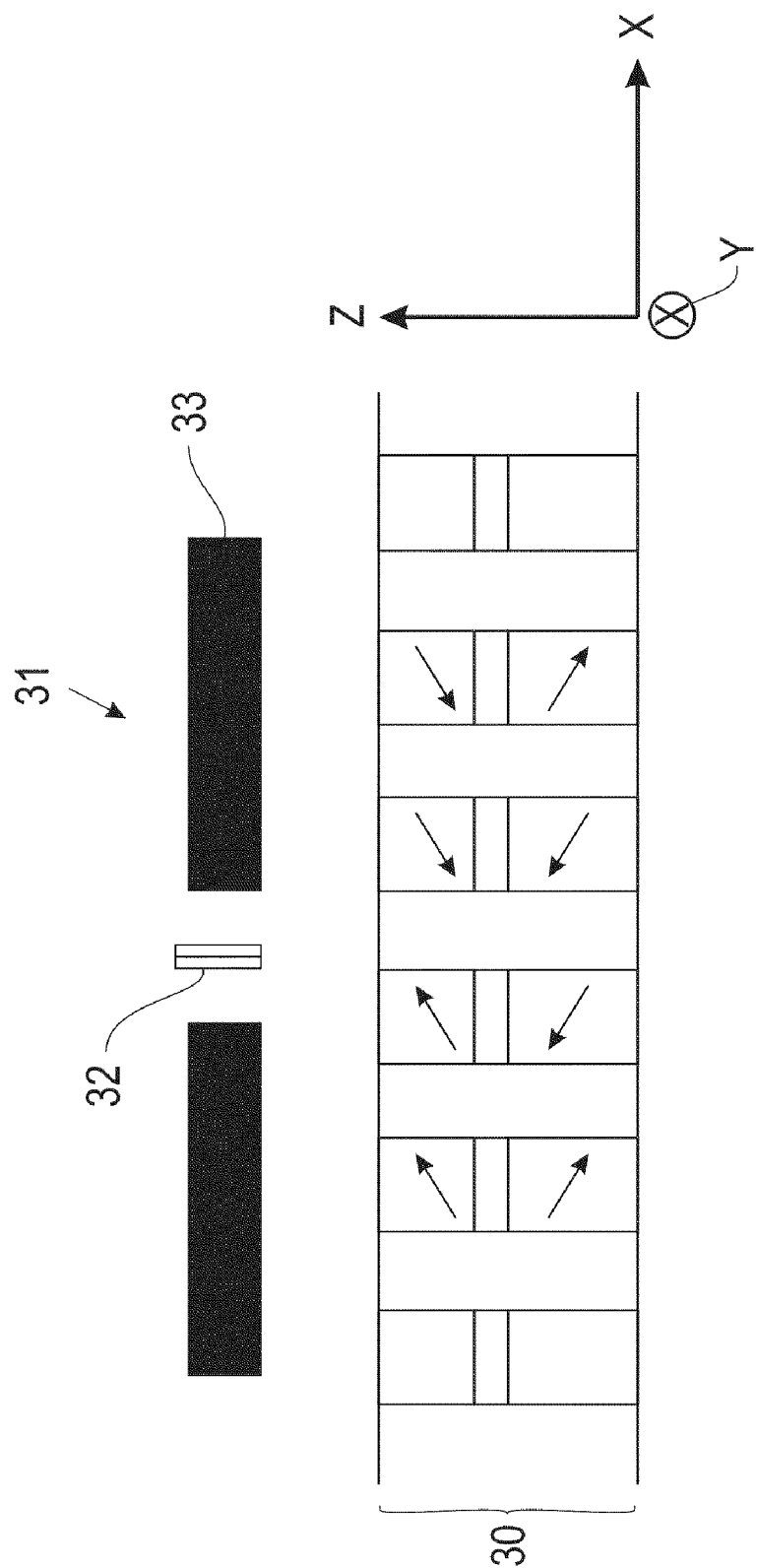
FIG. 6A depicts a magnetic read head above the magnetic medium of FIG. 1, in accordance with embodiments of the present invention.

FIG. 6A depicts a magnetic read head 31 above the magnetic medium 30 of FIG. 1, such that the read head 31 is configured to move in the +X or −X direction, in accordance with embodiments of the present invention. The read head 31, which comprises a magnetoresistive read element 32 and a magnetic shield 33 surrounding the magnetoresistive read element 32, is configured to read data from the magnetic medium 30.

Figure 6B:
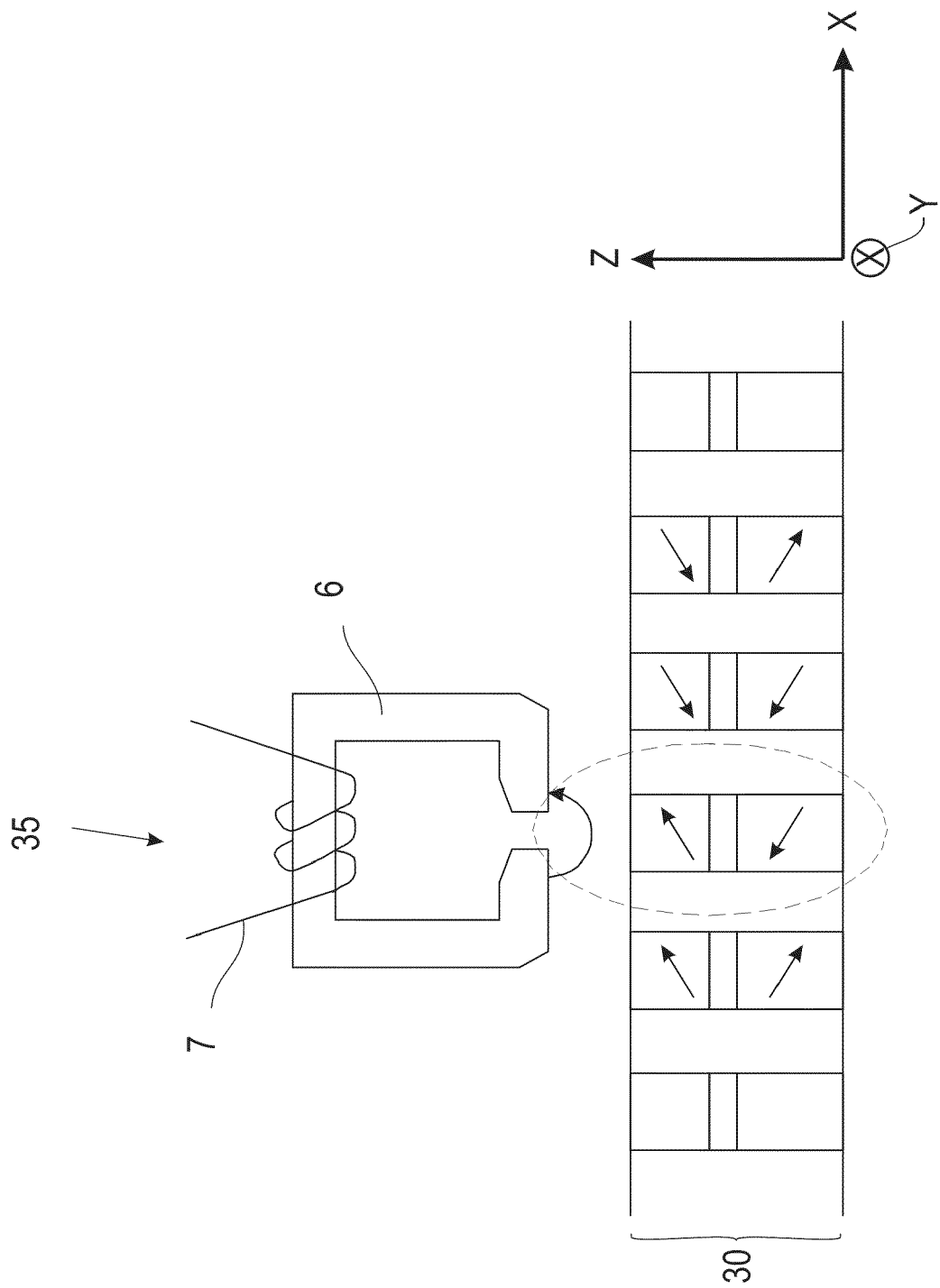
FIG. 6B depicts a magnetic write head above a magnetic medium, in accordance with embodiments of the present invention.

FIG. 6B depicts a magnetic write head 35 above the magnetic medium 30 of FIG. 1, in accordance with embodiments of the present invention. The write head 35 comprises a coil 7 wound around a soft core 6 and configured to carry an electric current in the coil wire 7 for generating a magnetic field that extends into the medium 30 and has a field strength exceeding the coercivity (i.e., switching field) of the medium 30 so as to write data to the magnetic medium 30.

Figure 6C:
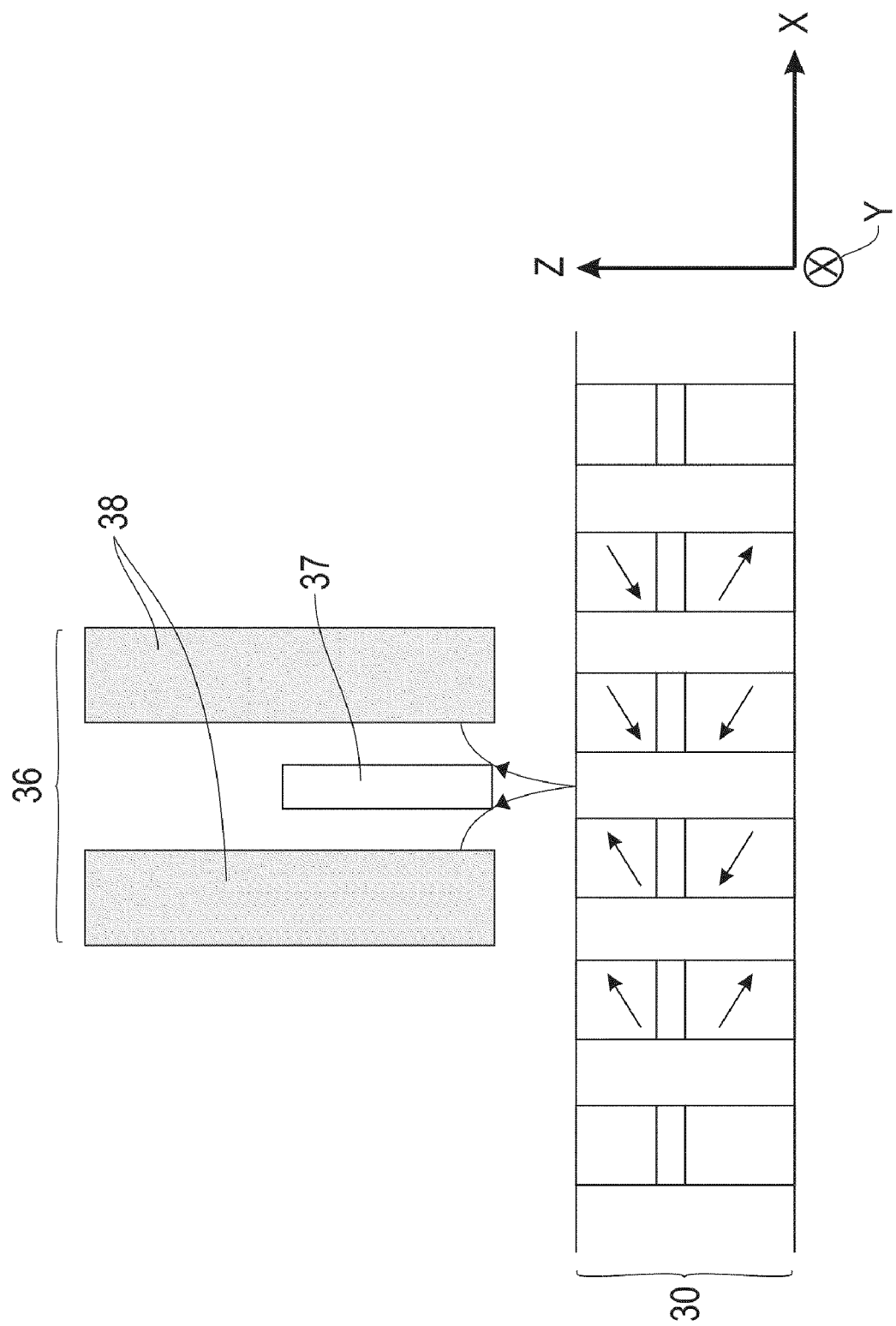
FIG. 6C depicts a magnetic read head above a magnetic medium, in accordance with embodiments of the present invention.

FIG. 6C depicts a magnetic read head 36 above the magnetic medium 30 of FIG. 1, in accordance with embodiments of the present invention. The read head 36, which comprises a magnetoresistive read element 37 and a magnetic shield 38 surrounding the magnetoresistive read element 37, is configured to read data from the magnetic medium 30.

Figure 6D:
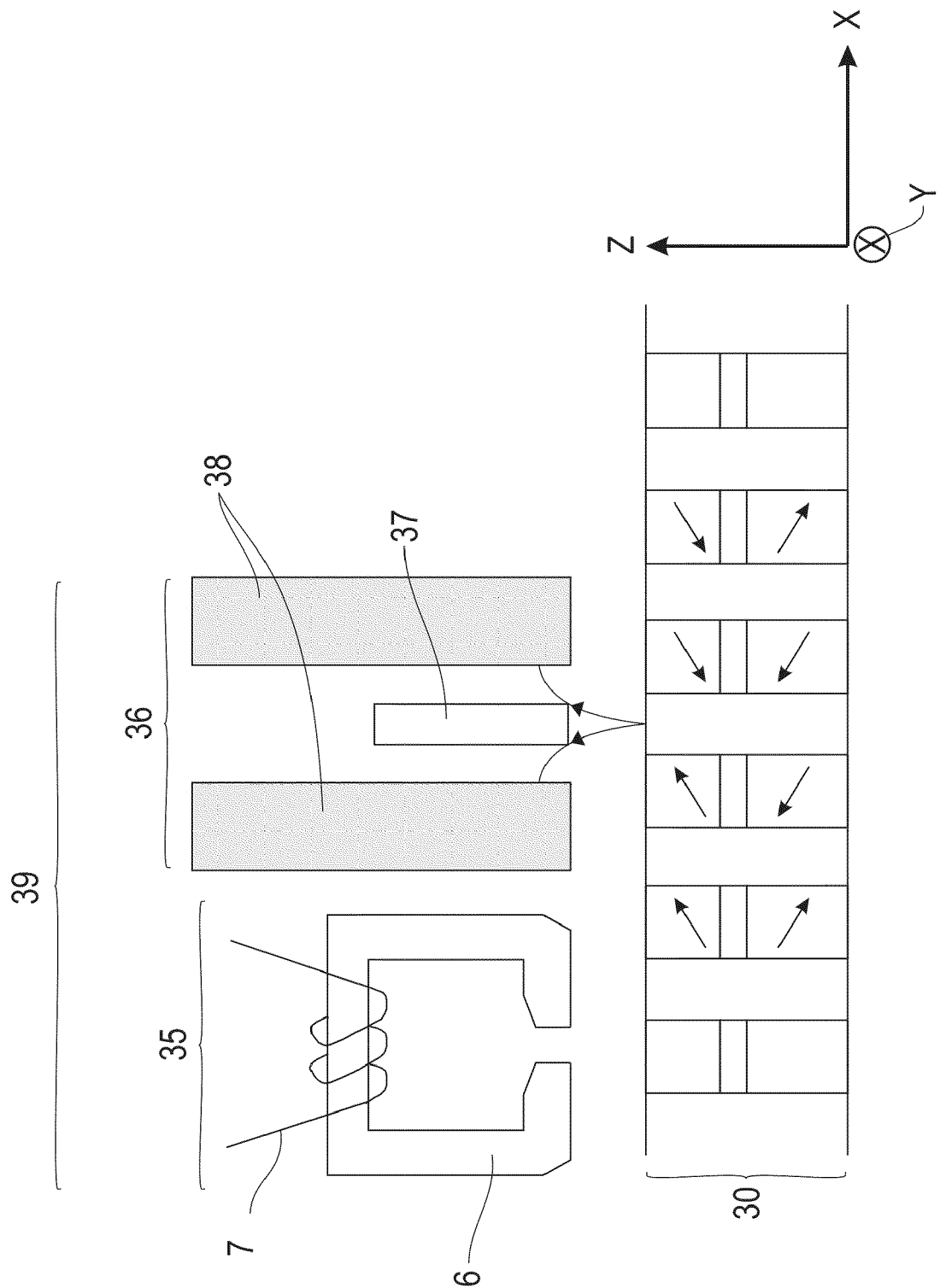
FIG. 6D depicts a magnetic read/write head above a magnetic medium, in accordance with embodiments of the present invention.

FIG. 6D depicts a magnetic read/write head 39 above the magnetic medium 30, in accordance with embodiments of the present invention. The magnetic read/write head 39, which comprises the write head 35 of FIG. 6B and the read head 36 of FIG. 6C, is configured to both write data to and read data from the magnetic medium 30.

In FIGS. 6A-6D, the read heads 31 and 36 and the write head 35 each extend along the Y direction over a distance that allows the read heads and the write head to effectively read and write one pillar at a time. In one embodiment, the spatial extent of the read and/or write head along the Y direction is about equal to the period of the array of pillars in the Y direction.

For the description herein, a magnetic write head is a magnetic head that is configured to write to, but not to read from, a magnetic medium (e.g., the write head 35 of FIG. 6B or of FIG. 6D). Similarly, a magnetic read head is a magnetic head that is configured to read from, but not write to, a magnetic medium (e.g., the read head 31 of FIG. 6A or the read head 36 of FIG. 6C or FIG. 6D).

In FIG. 1, each top island 11 comprises magnetic material having a magnetic easy axis tilted at an angle $\alpha_t$ ($-90<\alpha_t<90$) with respect to the X axis, a magnetic hard axis tilted at an angle $\alpha_t^*$ ($-180<\alpha_t^*<0$) with respect to the X axis, a switching field $H_{sw,t}$, a remanent magnetization $M_{r,t}$, and a volume $V_t$. The magnetization 21 represents a magnetic state in the top island 11 that is oriented along the easy axis, either at the angle $\alpha_t$ with respect to the X axis or at the angle $180+\alpha_t$ with respect to the X axis.

Each bottom island 12 comprises magnetic material having a magnetic easy axis that is tilted at an angle $\alpha_b$ ($-90<\alpha_b<90$) with respect to the X axis, a magnetic hard axis tilted at an angle $\alpha_b^*$ ($-180<\alpha_b^*<0$) with respect to the X axis, a switching field $H_{sw,b}$, a remanent magnetization $M_{r,b}$, and a volume $V_b$. The magnetization 22 represents a magnetic state in the bottom island 12 that is oriented along the easy axis, either at the angle $\alpha_b$ with respect to the X axis or at the angle $180+\alpha_b$ with respect to the X axis.

The hard axis tilt angle $\alpha_t^*$ can be between −80 and −10 degrees. Then, if recording in both +X and −X directions is required, $\alpha_b^*$ should be between −170 and −100 degrees. Otherwise, $\alpha_b^*$ can be any angle given certain conditions that vary with $\alpha_t^*$, $H_{sw,b}/H_{sw,t}$ ratio, the thicknesses in the pillar 10 in the Z direction, the head-media spacing, and the write head characteristics.

The hard axis tilt angle $\alpha_b^*$ can be between −80 and −10 degrees. Then, if recording in both +X and −X directions is required $\rho_t^*$ should be between −170 and −100 degrees. Otherwise, $\alpha_t^*$ can be any angle given certain conditions that vary with $\alpha_b^*$, $H_{sw,b}/H_{sw,t}$ ratio, the thicknesses in the pillar 10, the head-media spacing, and the write head characteristics.

The angles $\alpha_t^*$, $\alpha_b^*$, $\alpha_t$, $\alpha_b$, of the top islands 11 and the bottom islands 12 in each pillar 10, the dimensions and volumes $V_t$, $V_b$ of the top islands 11 and the bottom islands 12, the thickness of the spacer layer 16, the magnetic materials of the top islands 11 and the bottom islands 12, and the switching fields $H_{sw,t}$, $H_{sw,b}$ of the top islands 11 and the bottom islands 12, respectively, can be adjusted for optimum writing, optimum data retention, and such that all four possible magnetization states of a pillar 10 are differentiated in the readback signal.

Each pillar 10 can be made of a large assembly of nanoparticles with a similar easy axis within each island and independent easy axis for each island in the pillar. When all nanoparticles are aligned in the same positive direction, and when the pillar has no spacer layer, the depth of the transition between the top and bottom bits can be defined by the write current applied to the magnetic head 35 of FIG. 6B or FIG. 6D.

There are various methods to fabricate patterned media such as, inter alia, deposition on a patterned substrate, patterning by etching continuous layers, ion irradiation through a mask, or self-assembly.

The present invention enables writing the two-level patterned magnetic medium 30 at the two depths simultaneously.

With 2 levels being written to, there are $2^2=4$ possible magnetization states A, B, C, D in each pillar 10. Each magnetization state is defined by the orientation of the magnetization $M_{r,t}$ and $M_{r,b}$ in the top and bottom islands, respectively. With +1 corresponding to the magnetization along $\alpha_t$ or $\alpha_b$, −1 corresponding to the magnetization along $180+\alpha_t$ or $180+\alpha_b$, the 4 magnetization states are A=[+1,+1], B=[−1;−1], C=[+1,−1], D=[−1,+1]. Thus, the magnetization state [S1; S2] represents A, B, C, or D with the first magnetic state $S1=\pm 1$ and the second magnetic state $S2=\pm 1$ defining the magnetic orientation of the top islands 11 and the bottom islands 12, respectively.

The magnetization of the top islands 11 and the bottom islands 12 of one pillar 10 of the medium is set simultaneously by using an adequate write current applied to the magnetic write head 35 of FIG. 6B or FIG. 6D. For each of the 4 recording states (A, B, C, D) in the magnetic pillar 10, there is a different write current: I1, I2, −I1 and −I2. These write currents are defined by the write head characteristics, the head-media spacing, and the dimensions and magnetic parameters of the medium (hard axis angles, anisotropy field values, angular dependence of the switching fields, etc. . . . ). The writing process is described in detail infra.

Writing 4-bits data in the patterned pillars uses any write head such as a conventional write head (e.g., a conventional ring head). Such a write head generates magnetic fields in the magnetic medium. The field amplitude increases with increasing write current. The field amplitude decreases with increasing distance from the write gap center to a position in the medium. The field angle $\phi$ (with respect to the X axis) also varies depending on the relative position of the head to the medium as illustrated in FIG. 2.

Figure 2:
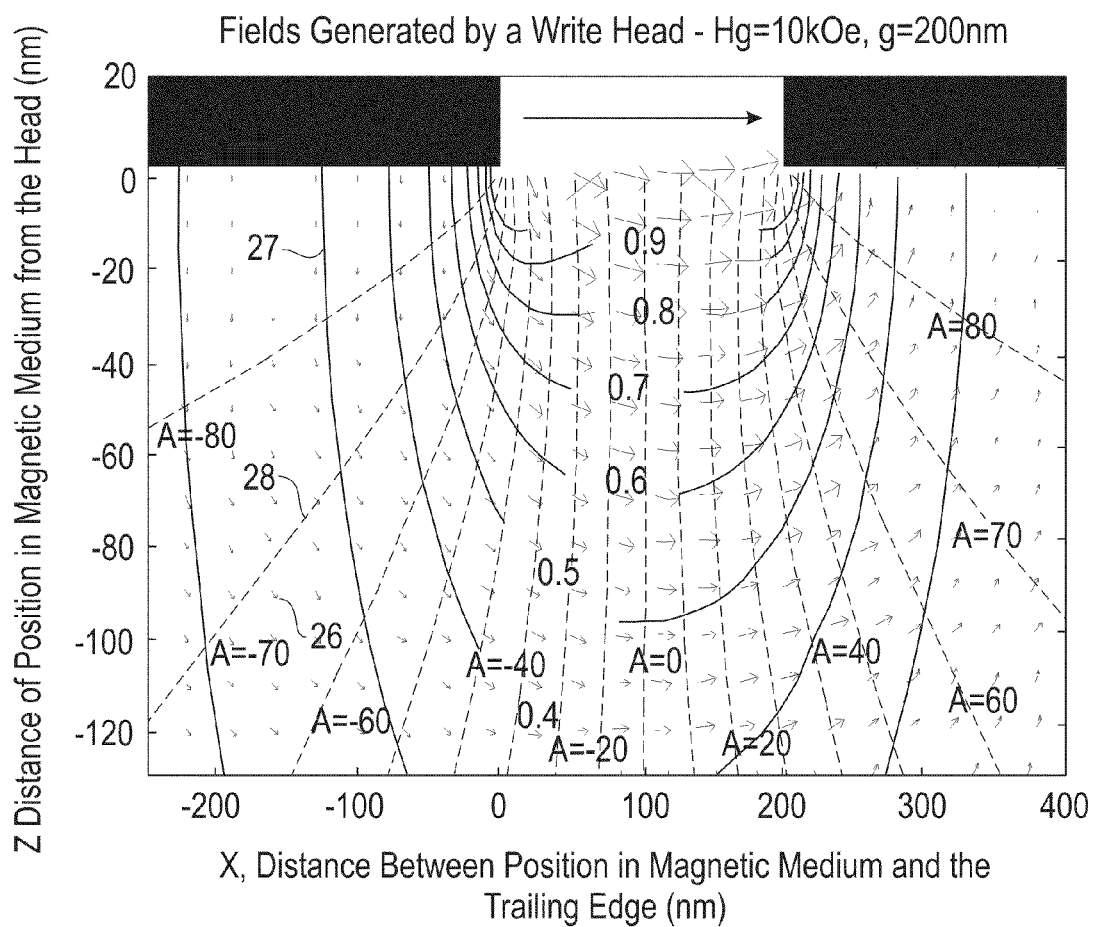
FIG. 2 is a representation of magnetic fields generated by a write head, in accordance with embodiments of the present invention.

FIG. 2 is a representation of magnetic fields generated by a write head, in accordance with embodiments of the present invention. Given a position (X, Z) in the magnetic medium, X denotes the distance (in the X direction) between the position (X, Z) in the magnetic medium and a trailing edge of the write head, and Z denotes the distance (in the Z direction) between the position (X, Z) in the magnetic medium and the write head. Arrows 26 represents magnetic field direction and field amplitude at given points. Lines 27 are contour plots of the field normalized to the deep gap field Hg (levels going from 0.2 to 1). Lines 28 are contour plots of the field angle $\phi$ (levels of 0 degree to +/−80 degrees). Note that Hg is proportional to the write current I: $Hg \cdot g = N \cdot I \cdot \epsilon$, with g the write gap, N the number of turns, and $\epsilon$ the efficiency of the head. This is a calculation using Karlqvist approximation with a write gap g of 200 nm.

A magnetic island of the patterned medium switches its magnetization when the field to which it is submitted is larger than its switching field ($H_{sw}$). The value of the switching field depends on the material properties of the magnetic island and of the relative angle between the applied field and the particle easy or hard axis direction. The material properties of the magnetic island is determined by the magnetic medium and defines the anisotropy field $H_a$.

Figure 3:
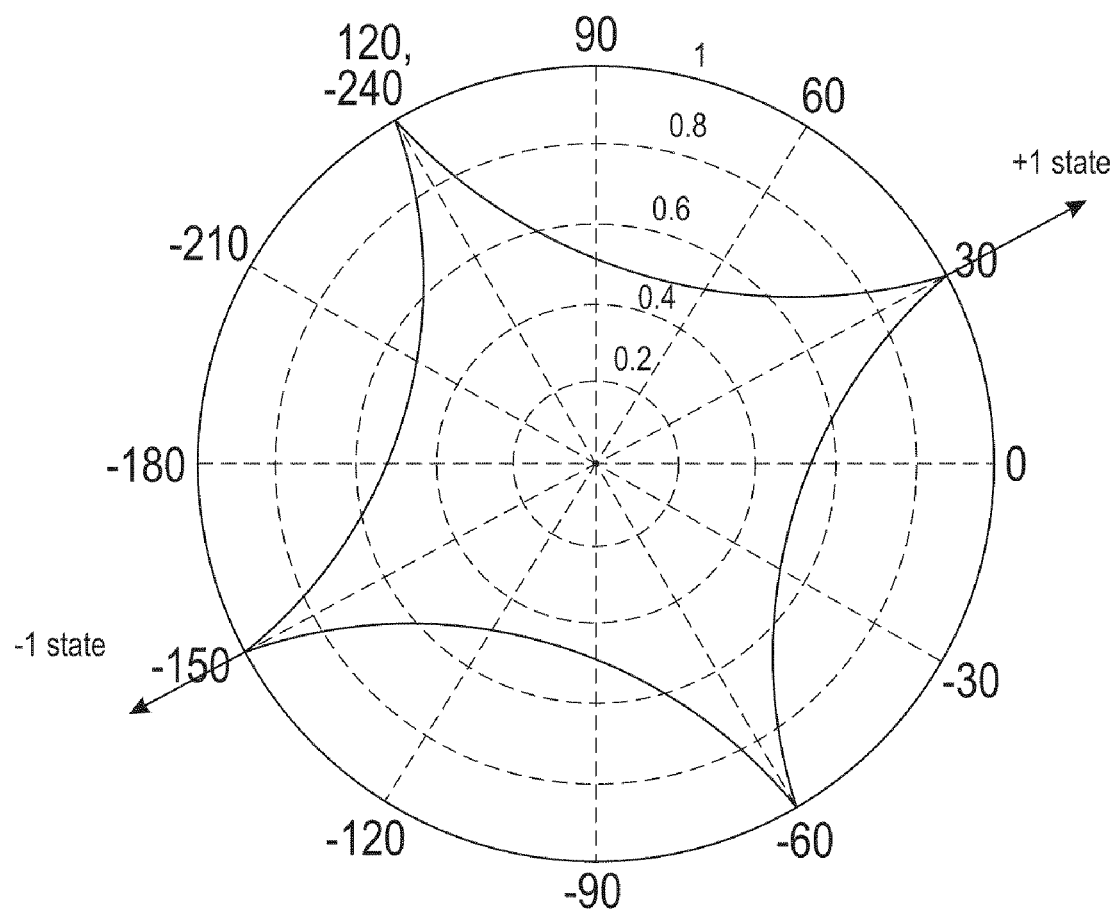
FIG. 3 depicts a Stoner-Wolfarth astroid representing the amplitude of switching field as a function of field direction related to easy axis direction along +30°, in accordance with embodiments of the present invention.

If the field (H) generated by the write head is larger than $H_{sw}(\phi)$ with $\alpha_0^* < \phi < \alpha_0^* + 180$ then the resulting state is +1 (M along $\alpha_0$), wherein $\phi$ is the angle of magnetic field in the magnetic medium with respect to the X direction, wherein $\alpha_0$ denotes the tilt angle, $\alpha_t$ or $\alpha_b$, of the magnetic easy axis in the top island or the bottom island, respectively, and wherein $\alpha_0^*$ denotes the tilt angle, $\alpha_t^*$ or $\alpha_b^*$, of the magnetic hard axis in the top island or the bottom island, respectively. In one embodiment, the magnetic material is characterized by the hard axis angle $\alpha_0^*$ being equal to $-90+\alpha_0$. If the field (H) is larger than $H_{sw}(\phi)$ with $\alpha_0^* - 180 < \phi < \alpha_0^*$, then the resulting state is −1 (M along $180+\alpha_0$). FIG. 3 (discussed infra) illustrates this with $\alpha_0=30°$ and Stoner-Wolhfarth model $H_{sw}(\phi) = H_a/[\sin^{(2/3)}(\phi-\alpha_0)+\cos^{(2/3)}(\phi-\alpha_0)]^{(3/2)}$ and $\alpha_0 = \alpha_0^* + 90$ used as an example of the dependence of the switching field vs. easy axis angle.

In one embodiment, the magnetic material is characterized by $|\alpha_0^* - \alpha_0|$ not being equal to 90 degrees.

FIG. 3 depicts a Stoner-Wolfarth astroid representing the amplitude of switching field as a function of field direction related to easy axis direction along +30°, in accordance with embodiments of the present invention. The hard axis angle is −60° for that model. For applied fields between [−60,120] the resulting state after all fields are switched off is +1 (along 30°direction). For fields between [−240,−60] the resulting state after all fields are switched off is −1 (along −150° direction).

As described supra, the fields created by a write head at the trailing edge have angles $\phi$ that vary from 0 to almost −90 degrees (with positive current) depending on the X position (X varying from 0 to −infinity). Moreover, the amplitude of the field decreases if the Z distance to the head increases and if the X position decreases towards −infinity, but is tuned by the write current.

From the discussion supra of FIGS. 2 and 3, the following facts (a), (b), (c), (d), (e) and (f) are deduced.

(a) For $\alpha_t^*$ between −10 and −80 degrees, and $\alpha_b^*$ between −180 and −90 degrees:

(a1) a positive write current (I1a) may be determined such that in the top island 11, $\alpha_t^* < \phi_t < 0$ and $H_t \geq H_{sw,t}(\phi_t)$ and simultaneously in the bottom island 12, $\alpha_b^* < \phi_b < 0$ and $H_b \geq H_{sw,b}(\phi_b)$, wherein $H_t$ and $H_b$ respectively denote the magnetic field strength in the top island 11 and the bottom island 12, and wherein $\phi_t$ and $\phi_b$ respectively denote the magnetic field direction relative to the X axis in the top island 11 and the bottom island 12. Then, after removal of all fields, the magnetization in top island 11 and bottom island 12 snaps back on the easy axis along $+\alpha_t$ and $-\alpha_b$ (state A).

(a2) a positive write current (I2a>I1a) may be determined such that: in the top island 11, $-90 < \phi_t < \alpha_t^*$ and $H_t \geq H_{sw,t}(\phi_t)$; and in the bottom island 12, $\alpha_b^* < \phi_b < 0$ and $H_b \geq H_{sw,b}(\phi_b)$. Then, after removal of all fields, the magnetization in both islands 11 and 12 snaps back on the easy axis along $180+\alpha_t$ for the top island 11 and $\alpha_b$ for the bottom island 12 (state D).

(a3) using currents of opposite polarities (−I1a and −I2a) the medium is written in the two other possible medium magnetization states (B and C respectively).

(b) For $\alpha_b^*$ between −80 and −10 degrees, and $\alpha_t^*$ between −180 and −90 degrees:

(b1) a positive write current (I1b) may be determined such that in the top island 11, $\alpha_t^* < \phi_t < 0$ and $H_t \geq H_{sw,t}(\phi_t)$ and simultaneously in the bottom island 12, $\alpha_b^* < \phi_b < 0$ and $H_b \geq H_{sw,b}(\phi_b)$. Then, after removal of all fields, the magnetization in both islands 11 and 12 snaps back on the easy axis along $+\alpha_t$ and $+\alpha_b$ (state A).

(b2) a positive write current (I2b>I1b) may be determined such that in the top island 11, $\alpha_t^* < \phi_t < 0$ and $H_t \geq H_t(\phi_t)$ and in the bottom island 12, $-90 < \phi_b < \alpha_b^*$ and $H_b \geq H_{sw,b}(\phi_b)$. Then, after removal of all fields, the magnetization in both islands 11 and 12 snaps back on the easy axis along $\alpha_t$ for the top island 11 and $180+\alpha_b$ for the bottom island 12 (state C).

(b3) using currents of opposite polarities (–I1b and –I2b) the medium is written in the two other possible medium magnetization states (states B and D respectively).

c) For $\alpha_t^*$ between –80 and –10 degrees, and $\alpha_b^*$ between –90 and 0 degrees that satisfies $\alpha_b^* < \phi_b < 0$ with $H_b \geq H_{sw,b}(\phi_b)$ at I2c everywhere in the bottom island 12:

(c1) a positive write current (I1c) may be determined such that in the top island 11, $\alpha_t^* < \phi_t < 0$ and $H_t \geq H_{sw,t}(\phi_t)$ and simultaneously in the bottom island 12, $\alpha_b^* < \phi_b < 0$ and $H_b \geq H_{sw,b}(\phi_b)$. Then, after removal of all fields, the magnetization in both islands 11 and 12 back on the easy axis along $+\alpha_t$ and $+\alpha_b$ (state A).

(c2) a positive write current (I2c>I1c) may be determined such that in the top island 11, $-90 < \phi_t < \alpha_t^*$ and $H_t \geq H_{sw,t}(\phi_t)$ and in the bottom island 12, $\alpha_b^* < \phi_b < 0$ and $H_b \geq H_{sw,b}(\phi_b)$. Then, after removal of all fields, the magnetization in both islands 11 and 12 snaps back on the easy axis along $180+\alpha_t$ for the top island 11 and $\alpha_b$ for the bottom island 12 (state D).

(c3) using currents of opposite polarities (–I1c and –I2c) the medium is written in the two other possible medium magnetization states (B and C respectively).

d) For $\alpha_b^*$ between –80 and –10 degrees, and $\alpha_t^*$ between –90 and 0 degrees that satisfies $\alpha_t^* < \phi_t < 0$ and $H_t \geq H_{sw,t}$ at I2d everywhere in the top island 11:

(d1) a positive write current (I1d) may be determined such that in the top island 11, $\alpha_t^* < \phi_t < 0$ and $H_t \geq H_{sw,t}(\phi_t)$ and simultaneously in the bottom island 12, $\alpha_b < \phi_b < 0$ and $H_b \geq H_{sw,b}(\phi_b)$. Then, after removal of all fields, the magnetization in both islands 11 and 12 snaps back on the easy axis along $+\alpha_t$ and $-\alpha_b$ (state A).

(d2) a positive write current (I2d>I1d) may be determined such that in the top island 11, $\alpha_t^* < \phi_t < 0$ and $H_t \geq H_{sw,t}(\phi_t)$ and in the bottom island 12, $-90 < \phi_b < \alpha_b^*$ and $H_b \geq H_{sw,b}(\phi_b)$. Then, after removal of all fields, the magnetization in both islands 11 and 12 snaps back on the easy axis along $\alpha_t$ for the top island 11 and $180+\alpha_b$ for the bottom island 12 (state C).

(d3) using currents of opposite polarities (–I1d and –I1d) the medium is written in the two other possible medium magnetization states (states B and D respectively).

e) For $\alpha_t^*$ between –80 and –10 degrees, and $\alpha_b^*$ between –90 and 0 degrees that satisfies $\alpha_b^* < \phi_b < 0$ with $H_b \geq H_{sw,b}(\phi_b)$ at 12e everywhere in the bottom island 12:

(e1) a positive write current (I1e) may be determined such that in the top island 11, $-90 < \phi_t < \alpha_t^*$ and $H_t \geq H_{sw,t}(\phi_t)$ and simultaneously in the bottom island 12, $-90 < \phi_b < \alpha_b^*$ and $H_b \geq H_{sw,b}(\phi_b)$. Then, after removal of all fields, the magnetization in both islands 11 and 12 back on the easy axis along $180+\alpha_t$ and $180+\alpha_b$ (state B).

(e2) a positive write current (I2e<I1e) may be determined such that in the top island 11, $-90 < \phi_t < \alpha_t^*$ and $H_t \geq H_{sw,t}(\phi_t)$ and in the bottom island 12, $\alpha_b^* < \phi_b < 0$ and $H_b \geq H_{sw,b}(\phi_b)$. Then, after removal of all fields, the magnetization in both islands 11 and 12 snaps back on the easy axis along $180+\alpha_t$ for the top island 11 and $\alpha_b$ for the bottom island 12 (state D).

(e3) using currents of opposite polarities (–I1e and –I2e) the medium is written in the two other possible medium magnetization states (A and C respectively).

f) For $\alpha_b^*$ between –80 and –10 degrees, and $\alpha_t^*$ between –90 and 0 degrees that satisfies $\alpha_t^* < \phi_t < 0$ and $H_t \geq H_{sw,t}(\phi_t)$ at I2f everywhere in the top island 11:

(f1) a positive write current (I1f) may be determined such that in the top island 11, $-90 < \phi_t < \alpha_t^*$ and $H_t \geq H_{sw,t}(\phi_t)$ and simultaneously in the bottom island 12, $-90 < \phi_b < \alpha_b^*$ and $H_b \geq H_{sw,b}(\phi_b)$. Then, after removal of all fields, the magnetization in both islands 11 and 12 back on the easy axis along $180+\alpha_t$ and $180+\alpha_b$ (state B).

(f2) a positive write current (I2f<I1f) may be determined such that in the top island 11, $\alpha_t^* < \phi_t < 0$ and $H_t \geq H_{sw,t}(\phi_t)$ and in the bottom island 12, $-90 < \phi_b < \alpha_b^*$ and $H_b \geq H_{sw,b}(\phi_b)$. Then, after removal of all fields, the magnetization in both islands 11 and 12 snaps back on the easy axis along $\alpha_t$ for the top island 11 and $180+\alpha_b$ for the bottom island 12 (state C).

(f3) using currents of opposite polarities (–I1f and –I2f) the medium is written in the two other possible medium magnetization states (states A and D respectively).

In one embodiment, $\pi_1 \neq \alpha_2$. In one embodiment, $|\alpha_1| \neq |\alpha_2|$.

Figure 4A:
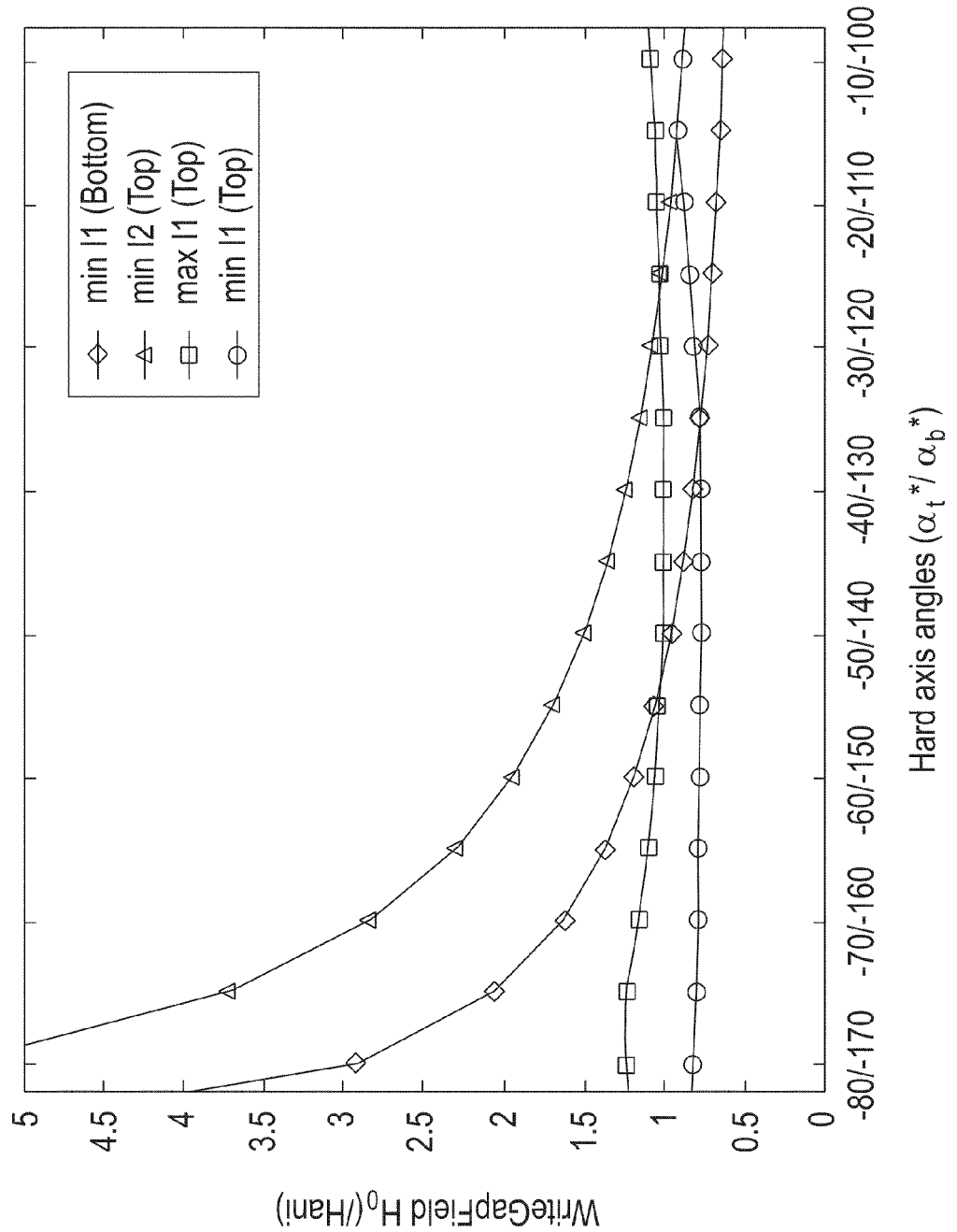
FIGS. 4A, 4B, 4C, 4D, 4E, and 4F show calculations of the write current for multi-level patterned magnetic media for various ranges of hard axis angle in the top and bottom islands, in accordance with embodiments of the present invention.
Figure 4B:
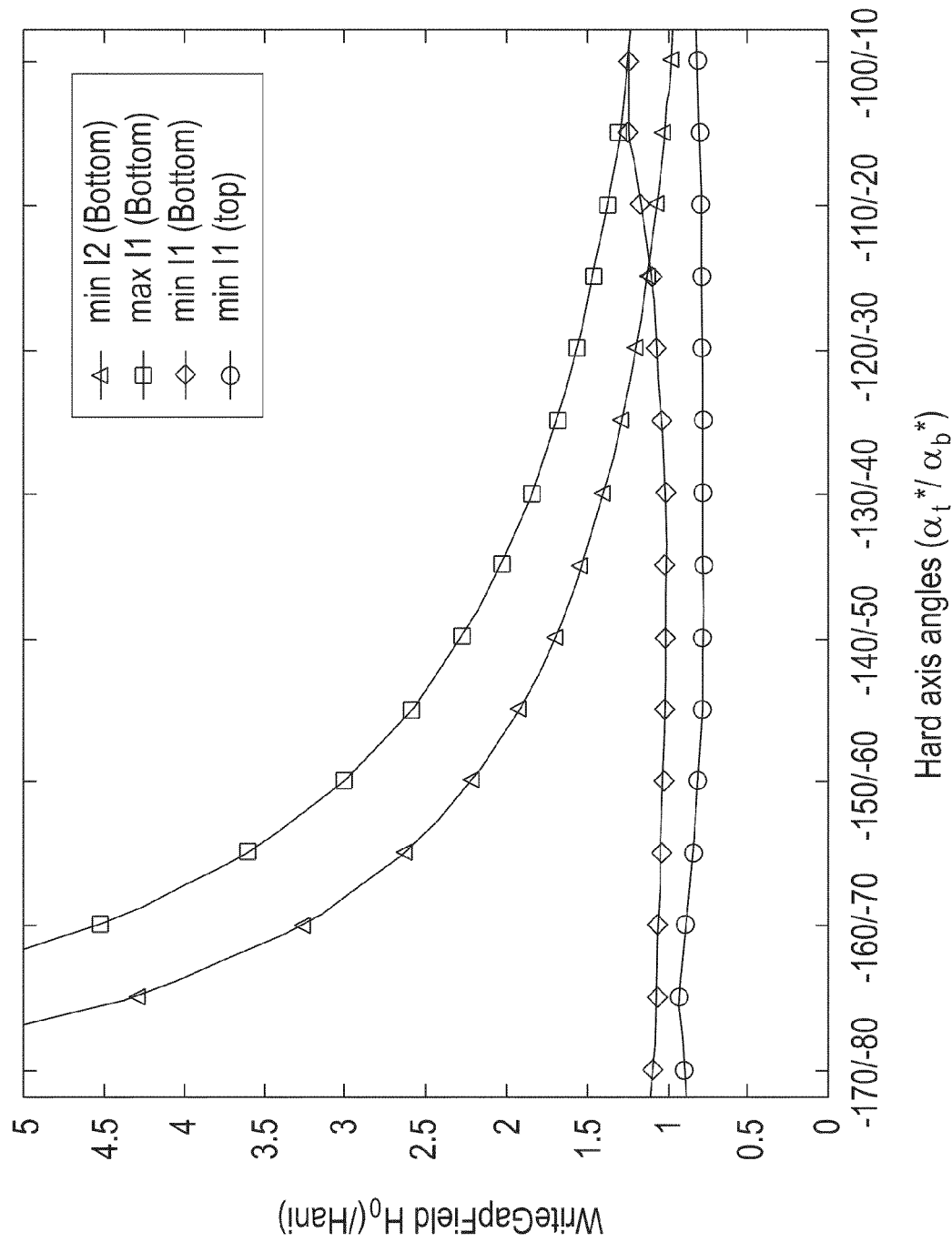
Figure 4C:
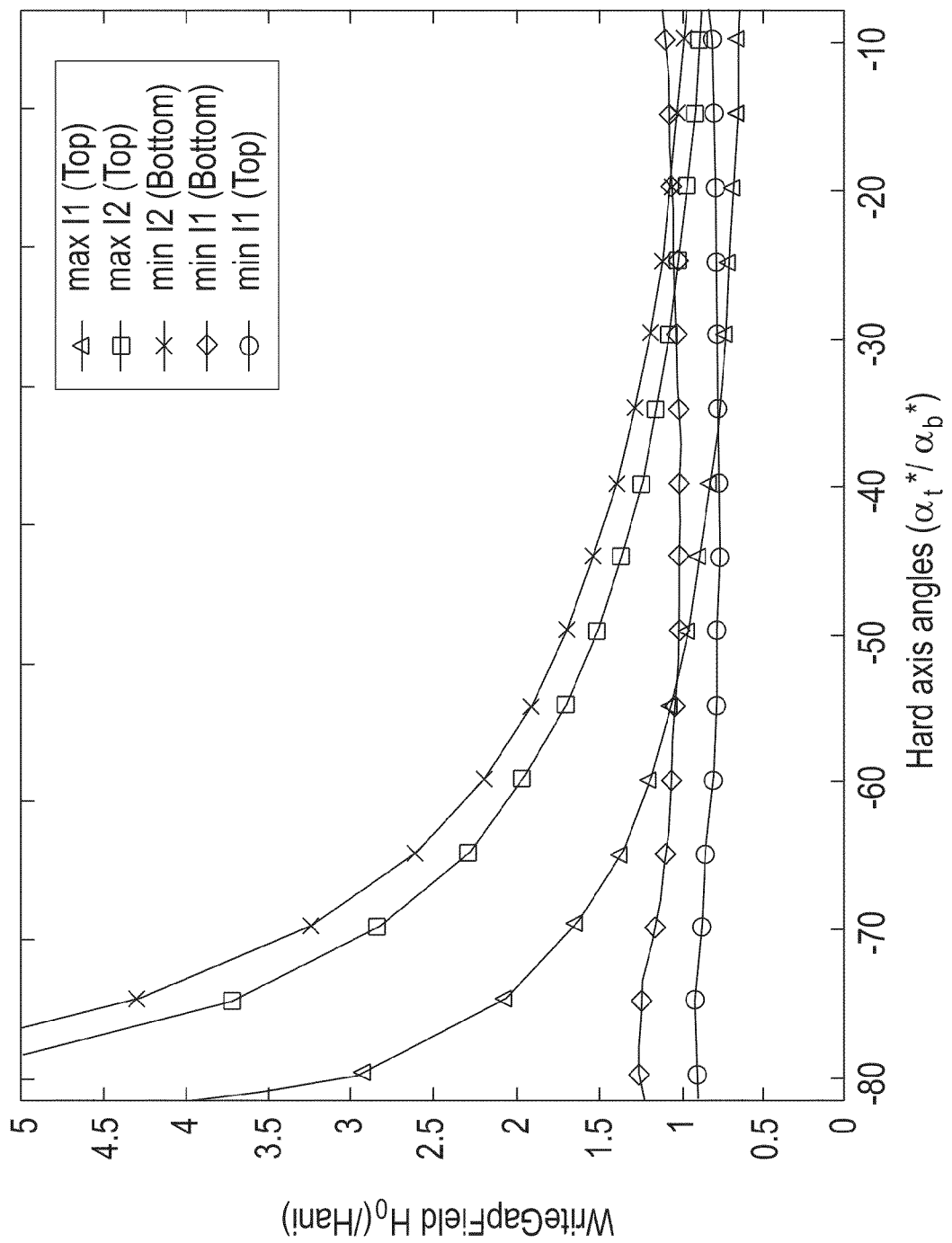
Figure 4D:
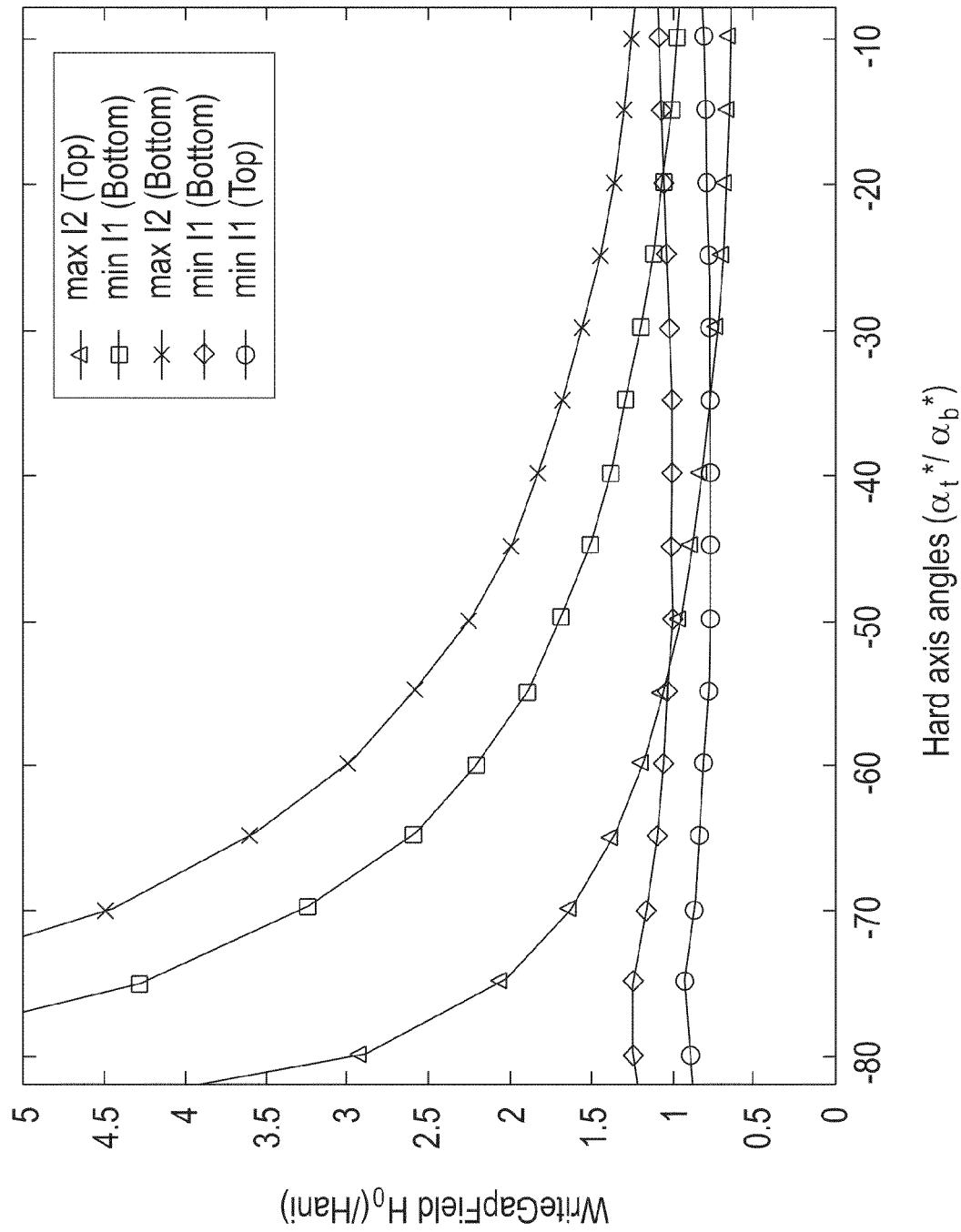
Figure 4E:
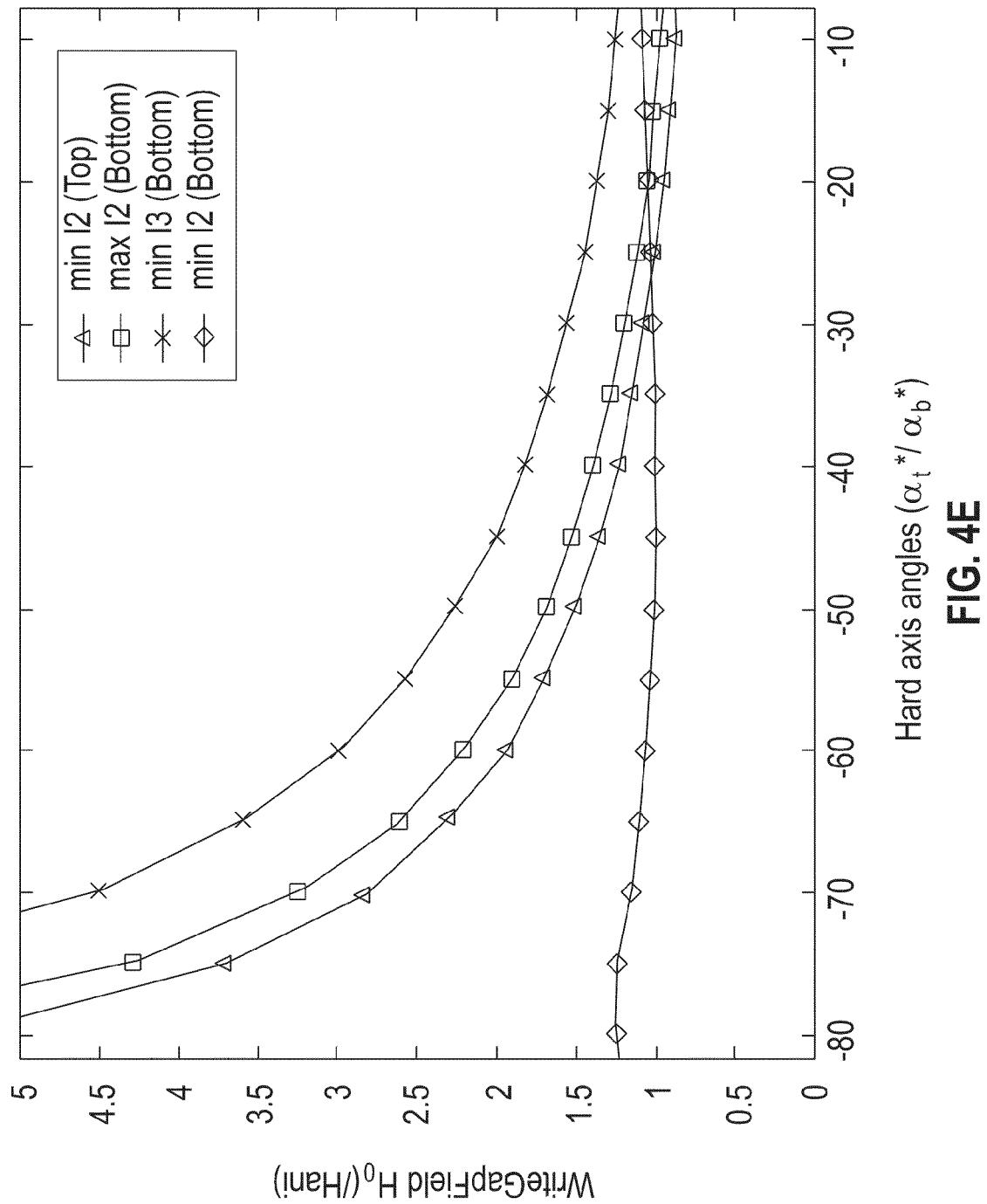
Figure 4F:
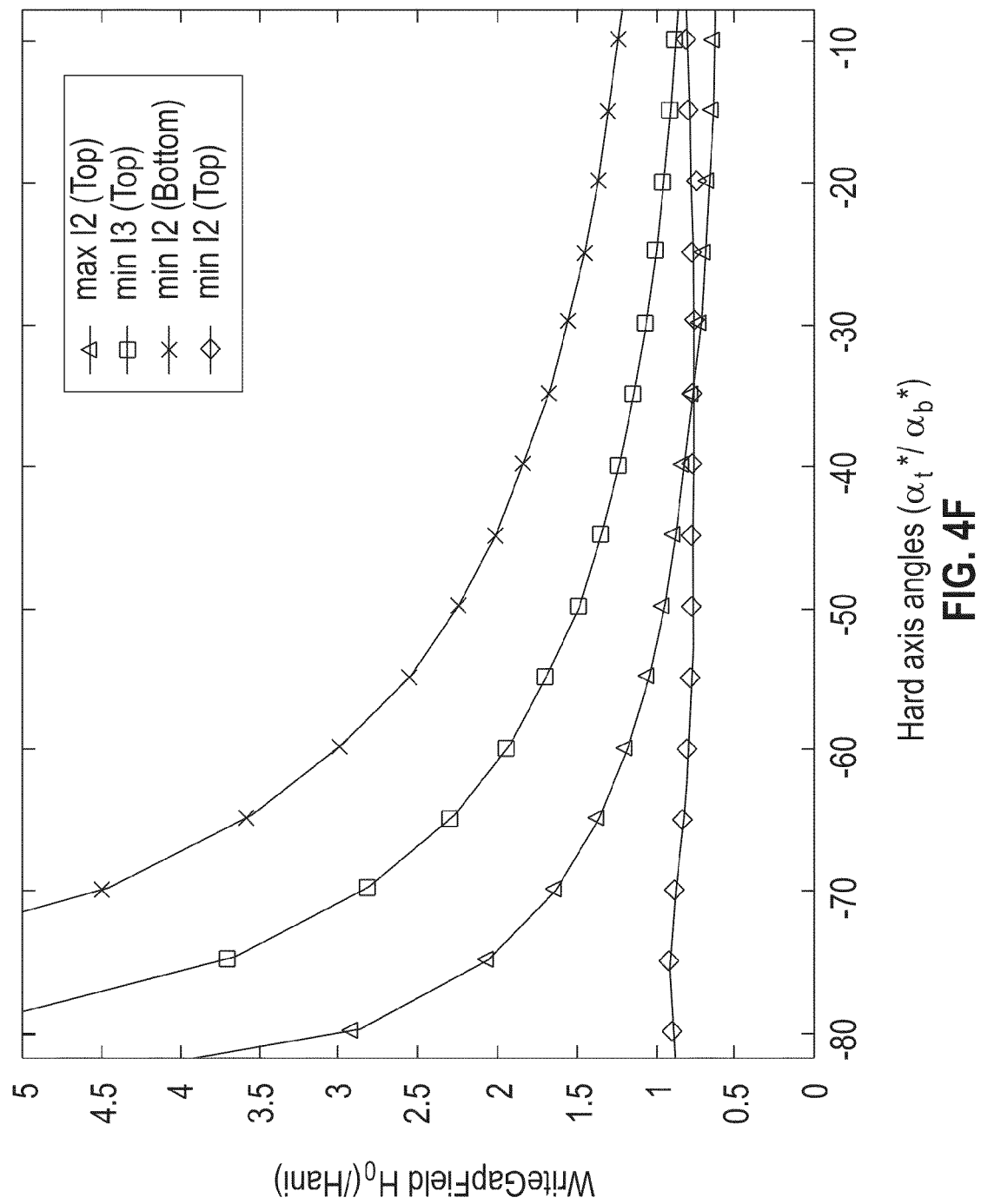

FIGS. 4A, 4B, 4C, 4D, 4E, and 4F (collectively, "FIG. 4") show a calculation of the write current (I1 and I2) for the two-level patterned magnetic media for various ranges of hard axis angle in the top and bottom islands, in accordance with embodiments of the present invention. In FIG. 4, the patterned magnetic medium comprises 30 nm thick top and bottom islands, a 10 nm thick spacer layer, a head-media spacing of 30 nm, and a write gap of 200 nm. Karlqvist head fields have been used to calculate the stray field from the write head. In FIG. 4, the deep gap field (which is directly proportional to the write current) is normalized to the anisotropy field of the island. Each island can have different anisotropy fields. The calculation of I1 and I2 write currents or corresponding deep-gap fields (normalized to the bit anisotropy) allow the top and bottom islands of the patterned medium to be written independently as a function of the hard angle absolute value of $\alpha_t^*$ (solid lines) and $\alpha_b^*$ (dotted lines). In FIG. 4A, $\alpha_t^*$ is between –80 and –10 degrees, and $\alpha_b^*$ is between –180 and –90 degrees. In FIG. 4B, $\alpha_t^*$ is between –80 and –10 degrees, and $\alpha_t$ is between –180 and –90 degrees. In FIG. 4C, $\alpha_t^*$ is between –80 and –10 degrees, and $\alpha_b^*$ is between –90 and 0 degrees. In FIG. 4D, $\alpha_b^*$ is between –80 and –10 degrees, and $\alpha_t^*$ is between –180 and 0 degrees. In FIG. 4E, $\alpha_t^*$ is between –80 and –10 degrees, and $\alpha_t^*$ is between –90 and 0 degrees. In FIG. 4F, $\alpha_b^*$ is between –80 and –10 degrees, and $\alpha_t^*$ is between –90 and 0 degrees.

With respect to forward and backward recording directions, if $\alpha_t^*$ is between –80 and –10 degrees, and $\alpha_b^*$ is between –170 and –100 degrees, then the two-level patterned medium can be written simultaneously at the two depths of the medium and independently of the recording direction. In the forward direction (head moving in the +X direction), the medium is written into the A, B, C, or D magnetization state using current I1a, I2a, –I1a or –I2a. In the backward direction (head moving in the –X direction), the angles are reversed and the 4 data bits are written using current I1b, I2b, –I1b and –I2b.

Additionally with respect to forward and backward recording directions, if $\alpha_t^*$ is between –170 and –100 degrees, and $\alpha_b^*$ is between –80 and –10 degrees, then the two-level patterned medium can be written simultaneously at the two levels of the medium and independently of the recording direction. In the forward direction (head moving in the +X direction), the medium is written into the A, B, C, or D magnetization state using current I1b, I2b, –I1b or –I2b. In the backward direction (head moving in the −X direction), the angles are reversed and the 4 data bits are written using current I1a, I2a, −I1a and −I2a.

Figure 5:
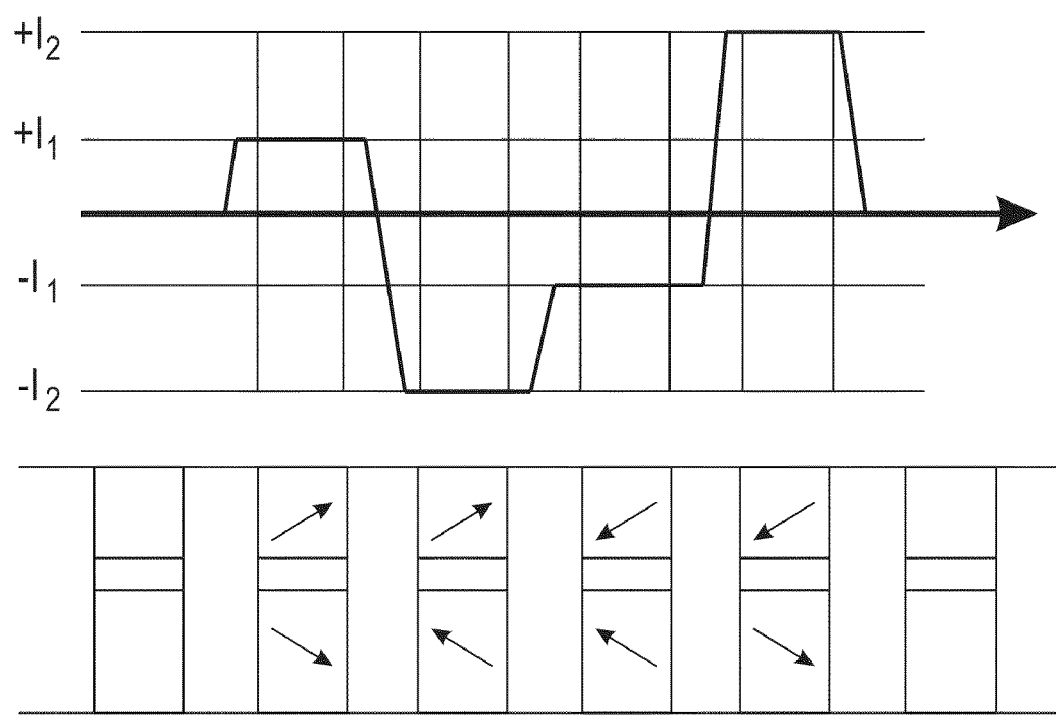
FIG. 5 illustrates a write-current pattern to write consecutive states on a two-level patterned magnetic medium, in accordance with embodiments of the present invention.

FIG. 5 illustrates a write-current pattern to write consecutive states A, C, B, D on a two-level patterned medium, in accordance with embodiments of the present invention. In FIG. 5, $\alpha_t$ is between +10 and +80 degrees, $\alpha_t^* = \alpha_t - 90$, and $\alpha_b$ is between −10 and −80 degrees, $\alpha_b^* = \alpha_b - 90$. The numerical values of ±I1 and ±I2 are determined from the write head characteristics, the head-media spacing, and the thicknesses of the top island, the bottom island and the spacer layer, and the magnetic parameters of the medium (hard axis angles, anisotropy field values, angular dependence of the switching fields), as explained supra. Thus, in contrast with continuous media where the bits can be written everywhere on the magnetic medium, writing on patterned media requires the synchronization of the write current pattern with the pillar pattern.

To determine the precise locations of the pillars as the magnetic head is moving in the X direction, so that required discrete write currents ±I1 and ±I2 are activated exactly when needed to generate the A, C, B, D states in the two pillars, a readback signal of the medium (or readback signal (write after read) or from reference written pillar or servo pillar in the case of multiple heads) may be used to detect the presence of the pillars as the magnetic head advances in the X direction.

For reading two levels of bits of the patterned tilted medium, the magnetic read head 31 in FIG. 6A (or the magnetic read head 36 of FIG. 6C or FIG. 6D) performs reading such as by using a conventional reading sensor (e.g., a magnetoresistive head) that passes above the medium at a given velocity and with a given head-media spacing.

Contrary to conventional continuous media, the readback waveform does not measure transitions of magnetization in the media but rather the amplitude of the stray fields generated by each individual pillar. As a result, for a two-level patterned medium, there are four distinctive waveforms corresponding to the recorded states A, B, C and D.

FIGS. 7A, 7B, 7C, and 7D (collectively, "FIG. 7") depict exemplary readback waveforms for the four magnetization states distributed in five consecutive pillars, in accordance with embodiments of the present invention. In the example of FIG. 7, the magnetic medium has pillars 200 nm long, 70 nm thick, spaced apart by 400 nm, with 30 nm thick top and bottom islands and a 10 nm thick spacer layer, $\alpha_t^* = -60°$, $\alpha_b^* = -120°$, $\alpha_t = 30°$, $\alpha_b = -30°$, $M_{r,t} = M_{r,b}$, and the period of the patterned medium is 600 nm. For the readback calculation, a read gap of 200 nm was assumed with a head/media spacing of 30 nm. Karlquist fields approximation is used both for the calculation of the readback waveforms.

Figure 7A:
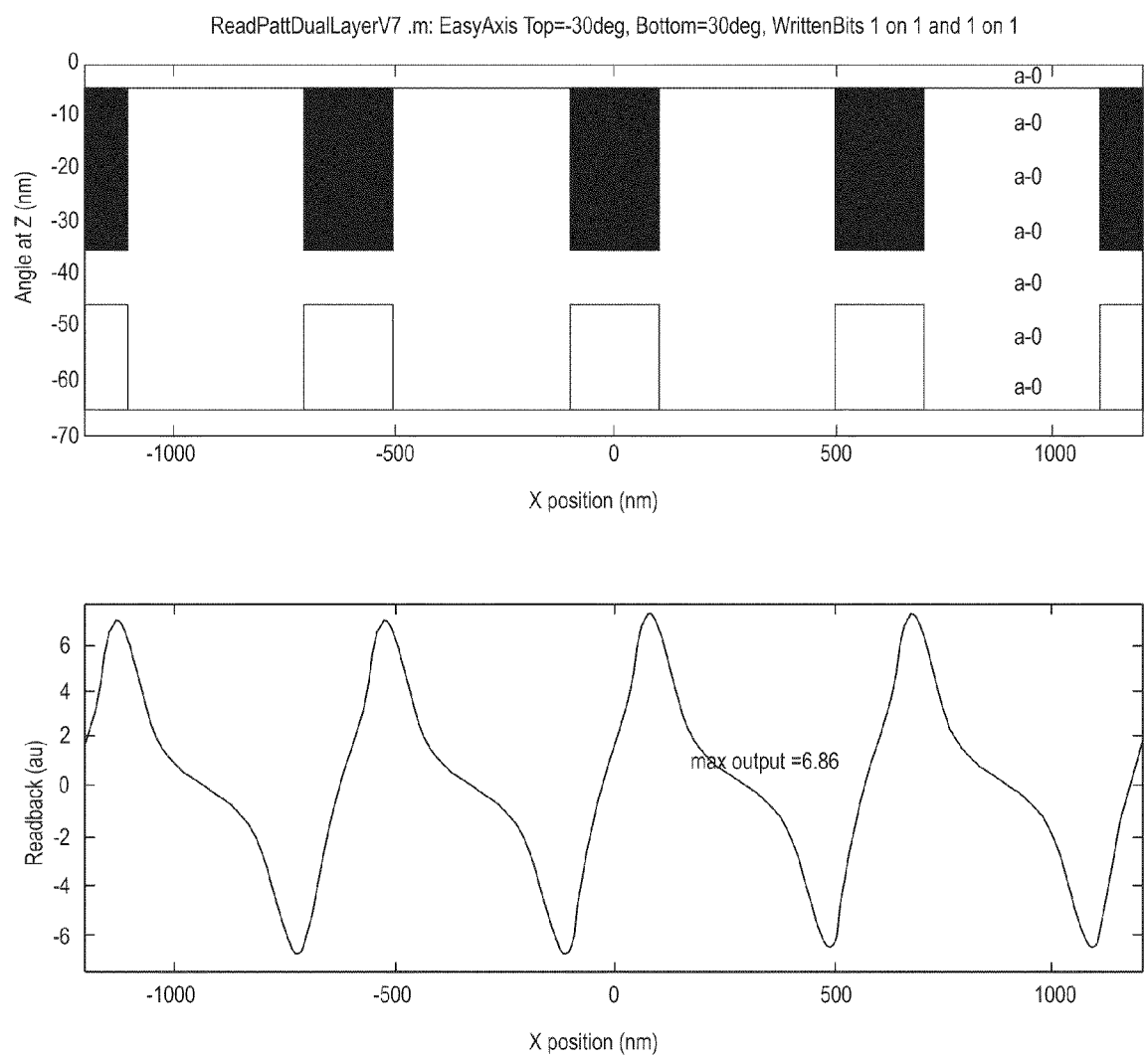
FIGS. 7A, 7B, 7C, and 7D depict exemplary readback waveforms for the four magnetization states distributed in five consecutive pillars, in accordance with embodiments of the present invention.
Figure 7B:
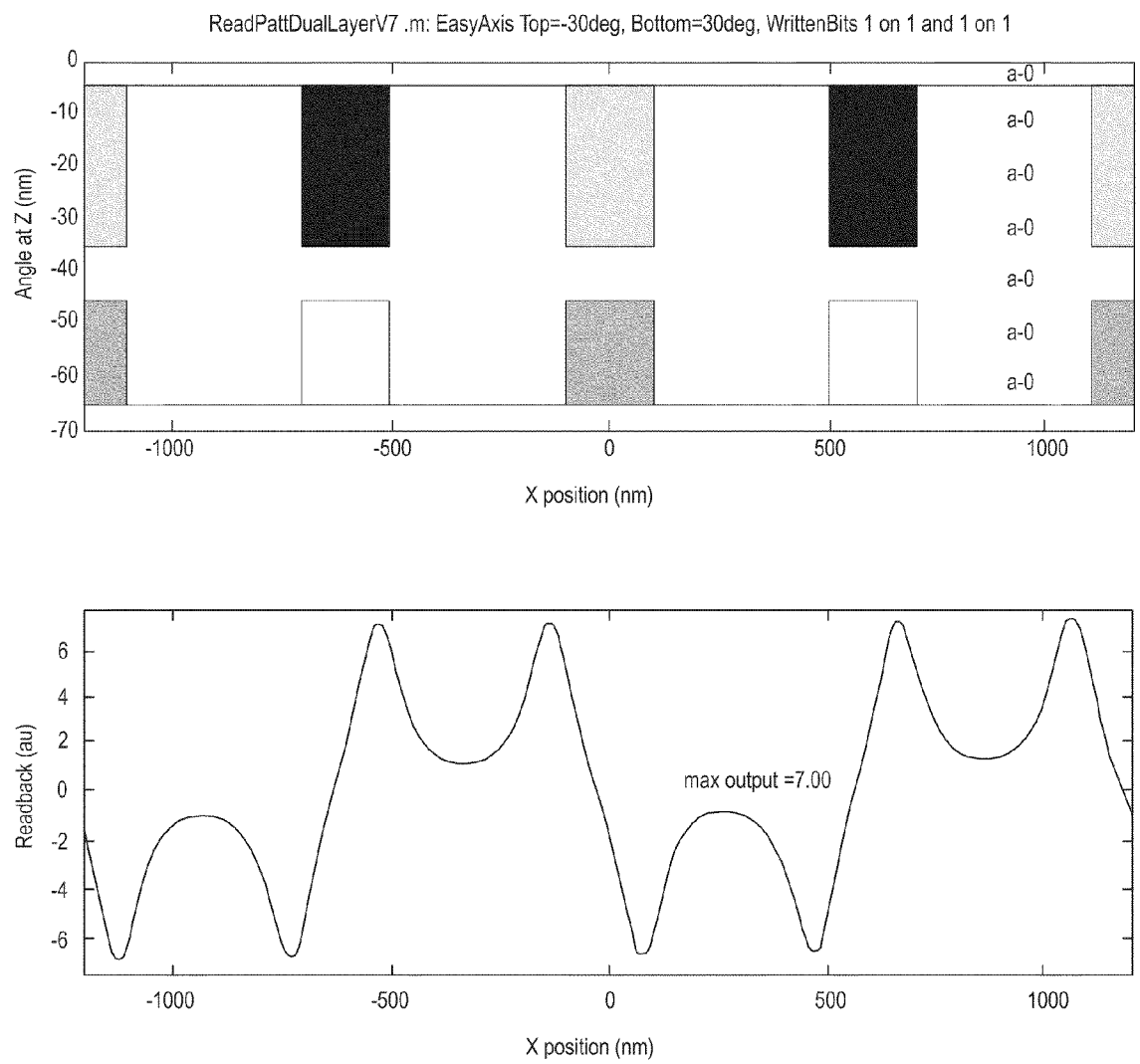
Figure 7C:
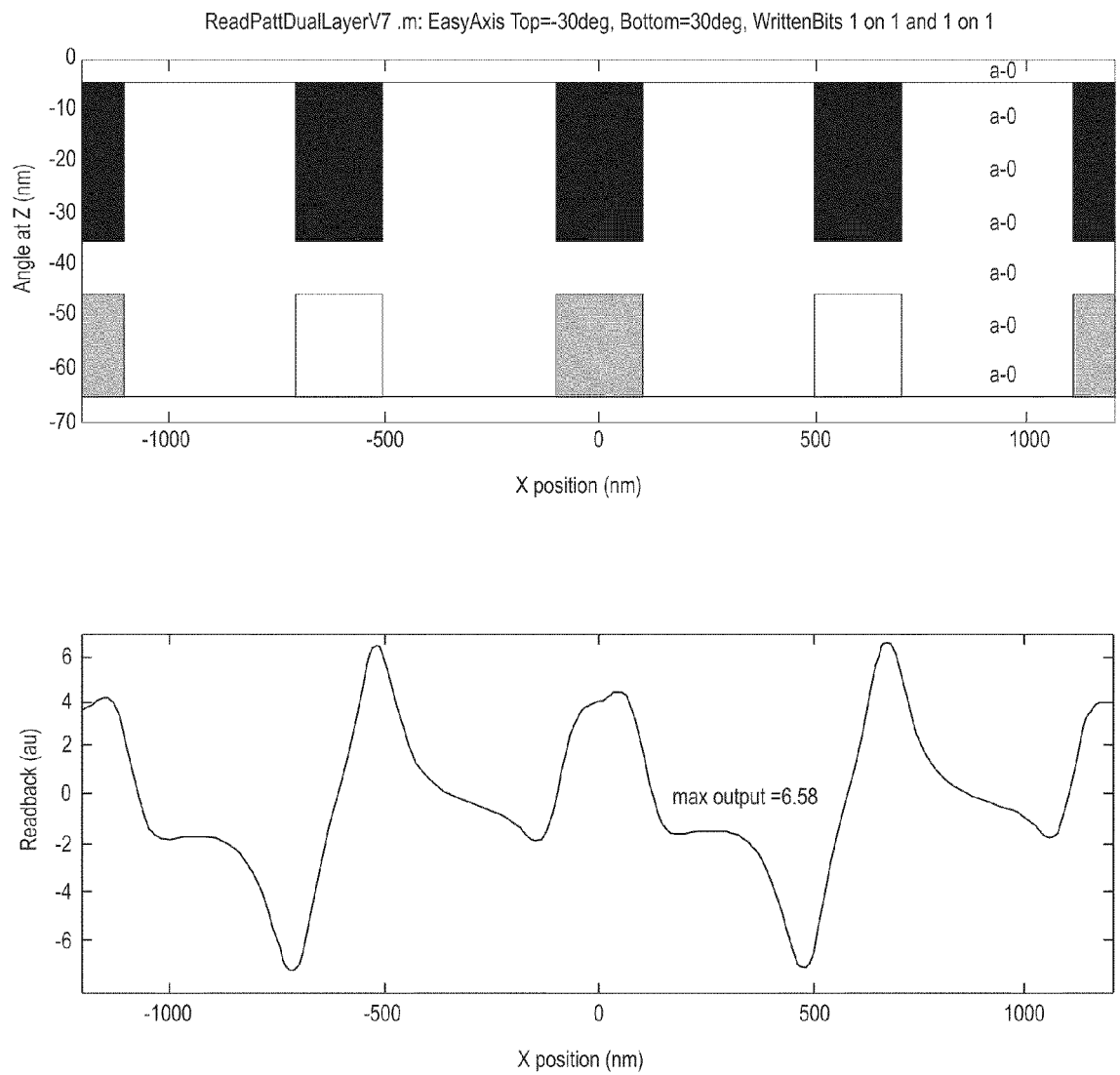
Figure 7D:
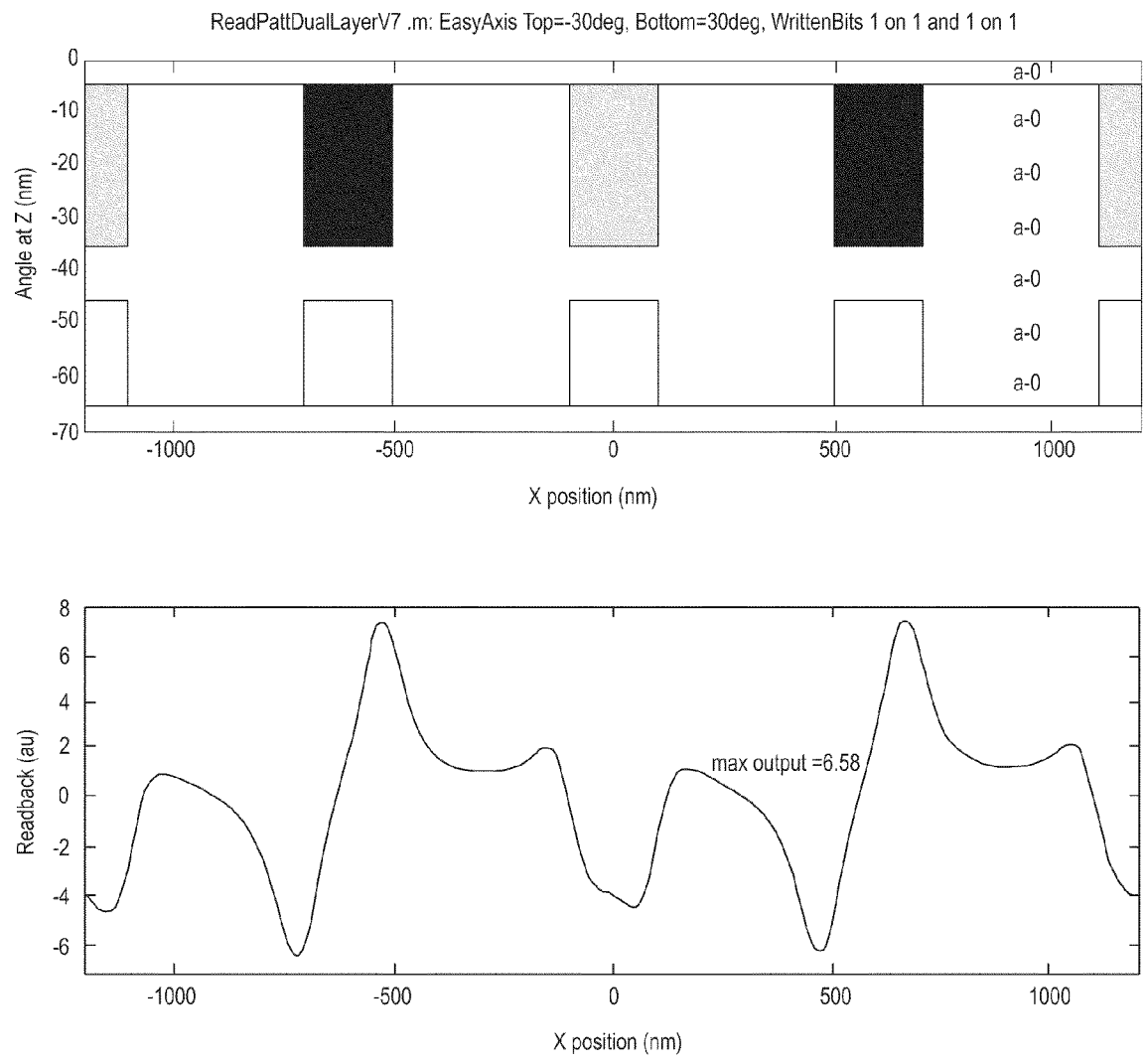

In FIG. 7A, the magnetization states in the five consecutive pillars are A-A-A-A-A. In FIG. 7B, the magnetization states in the five consecutive pillars are B-A-B-A-B. In FIG. 7C, the magnetization states in the five consecutive pillars are C-A-C-A-C. In FIG. 7D, the magnetization states in the five consecutive pillars are D-A-D-A-D. The individual readback waveforms in FIG. 7 are unique for each magnetization state A, B, C, and D, and easily distinguishable for each magnetization state A, B, C, and D.

Figure 8:
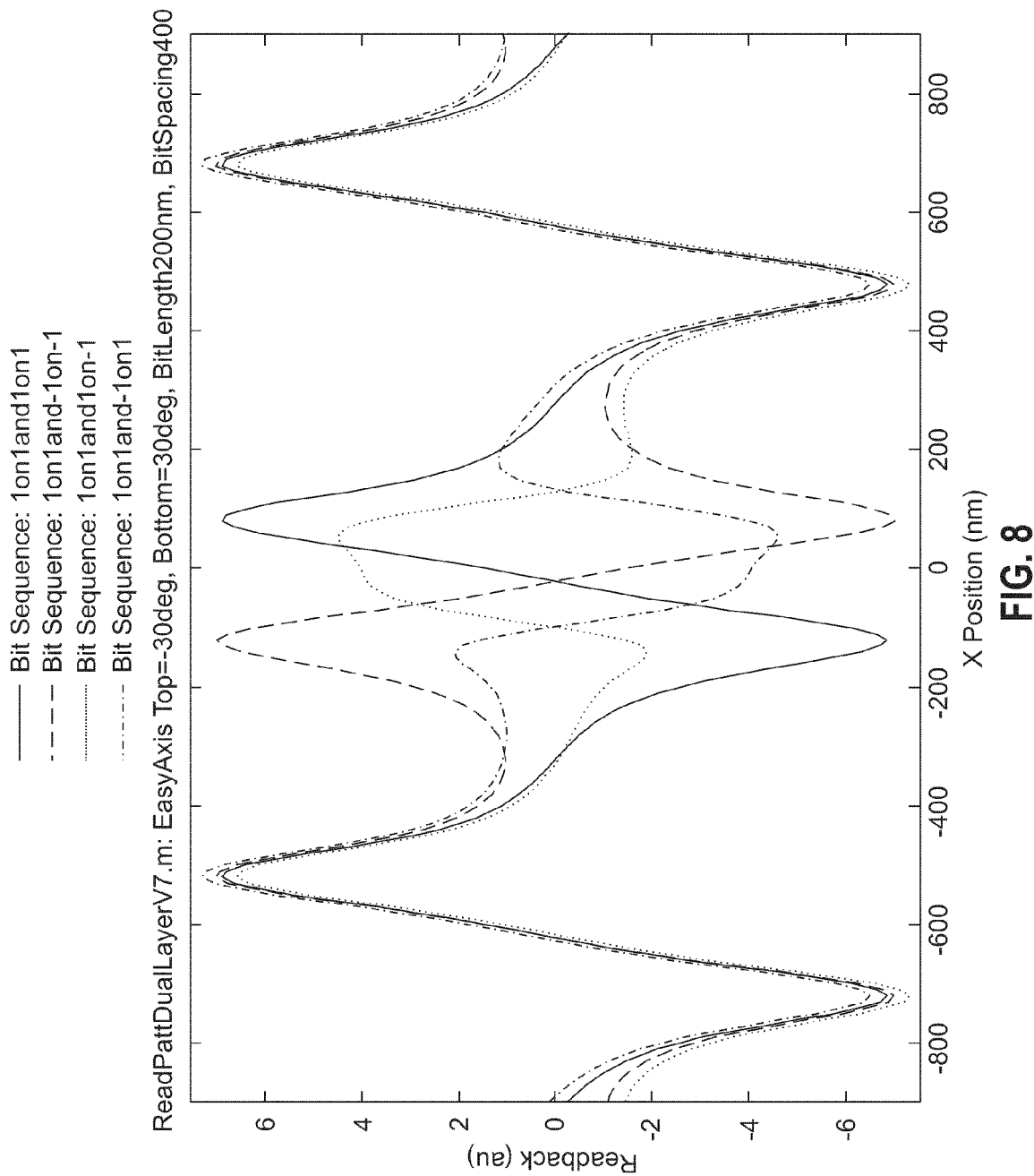
FIG. 8 depicts the readback waveforms of FIG. 7 together in one graphical plot, in accordance with embodiments of the present invention.

FIG. 8 depicts the readback waveforms of FIG. 7 together in one graphical plot, in accordance with embodiments of the present invention. The individual readback waveforms in FIG. 8 are unique for each magnetization state A, B, C, and D, and are easily distinguishable for each magnetization state A, B, C, and D, as may be confirmed by reviewing the waveforms for magnetization states A, B, C, and D at X=0 nm. Note that the amplitude level and shape of each of these readback waveforms can be optimized by the design of the medium and also depends on the write head and read head characteristics.

For a 2-level patterned magnetic medium described supra, the method of the present invention writes magnetic states of the two independent islands of a pillar simultaneously, thus allowing recording with doubled capacity in with a single writing step. The method of the present invention enables reading the magnetization states by decoding unique pulse shapes specific to the magnetization state.

Figure 9:
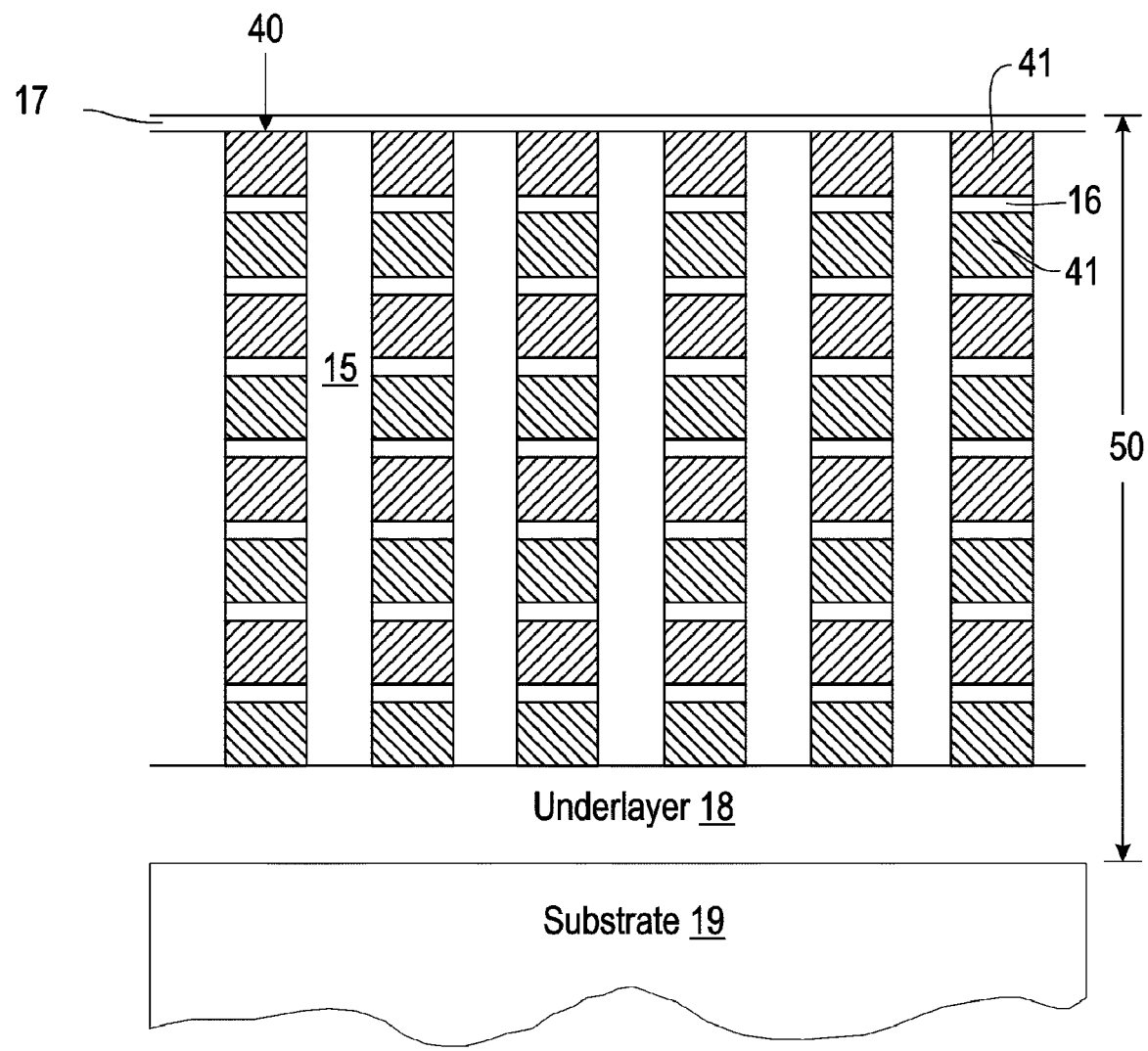
FIG. 9 is a schematic description of a multi-level patterned magnetic medium with more than two levels, in accordance with embodiments of the present invention.

FIG. 9 is a schematic description of a multi-level patterned magnetic medium 50 with N levels such that N is an integer of at least 2, in accordance with embodiments of the present invention. The magnetic medium 50 comprises a recording layer made of individual magnetic pillars 40 spaced apart from each other by non-magnetic material 15. The magnetic medium 50 may include an overcoat 17, and an under-layer 18 between the magnetic pillars 40 and a substrate 19.

Each magnetic pillar 40 comprises N magnetic islands 41 that are magnetically independent. In one embodiment, the islands are isolated from each other by a non-magnetic spacer layer 16. Each island 41 is a single-domain particle or an assembly of particles that behave as a single magnetic volume. A pair of islands 41 can be written in a single write step as described supra, resulting in a reduction in writing steps by a factor of 2 in comparison with existing writing methods. For cases of N>2, the two islands in the pair of islands 41 are not required to be two physically consecutive islands (i.e., two neighboring islands with no other island disposed therebetween).

In one embodiment, N is an even or odd integer of at least 2.

Figure 10:
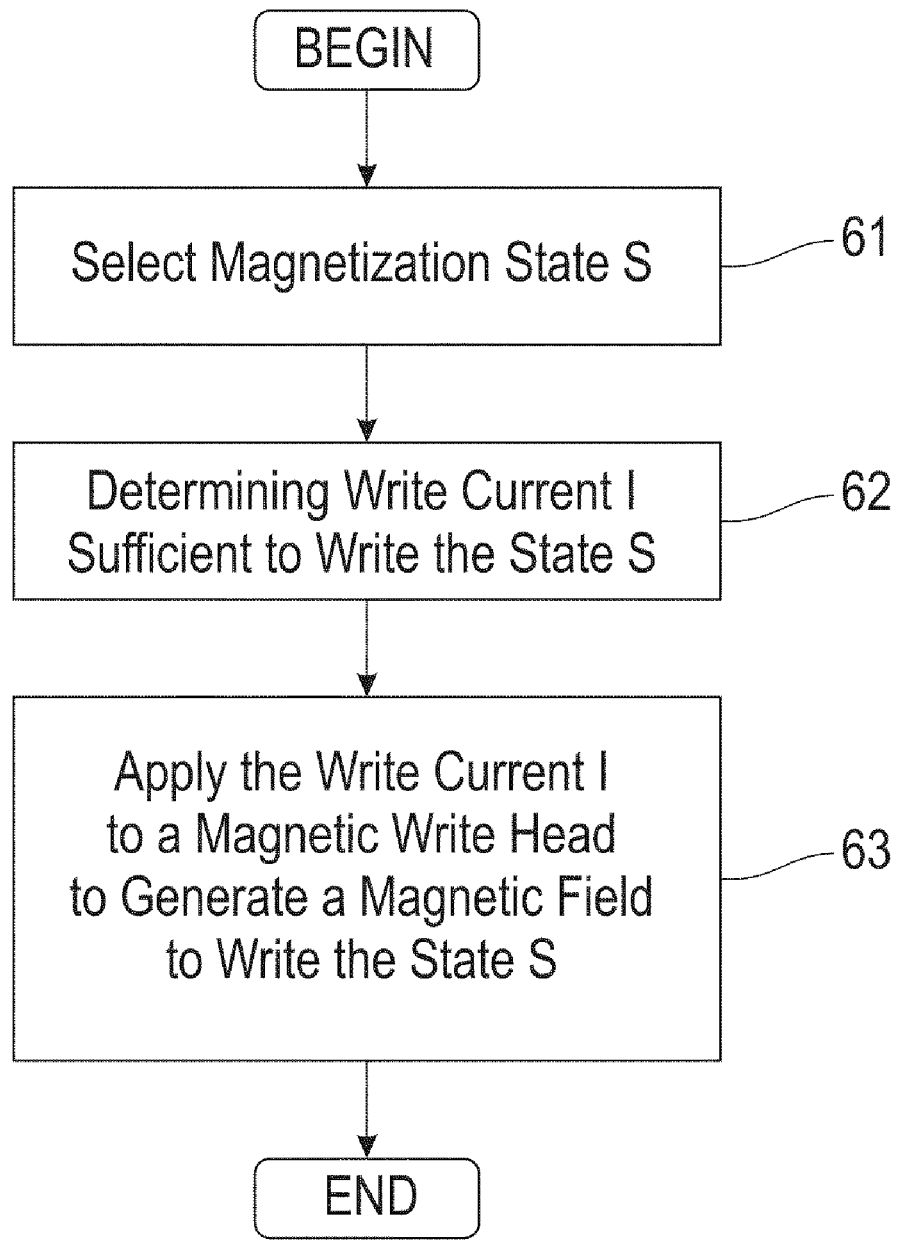
FIG. 10 is a flow chart of a method for writing a magnetization state in a multi-level patterned magnetic medium, in accordance with embodiments of the present invention.

FIG. 10 is a flow chart of a method for writing a magnetization state in a multi-level patterned magnetic medium, in accordance with embodiments of the present invention. The magnetic medium comprises a plurality of pillars, wherein each pillar is distributed in an X direction and a Y direction. Consecutive pillars of the plurality of pillars are separated by spacer material (e.g., non-magnetic material). Each pillar comprises N magnetic islands distributed in a Z direction, wherein the X, Y, and Z directions are mutually orthogonal. In one embodiment, consecutive magnetic islands in each pillar are separated by non-magnetic spacer material. The method of FIG. 10 comprises steps 61-63.

Step 61 selects a magnetization state S=[S1; S2] comprising a magnetic state (S51) in a first magnetic island of the N magnetic islands of a first pillar of the plurality of pillars and a magnetic state (S2) in a second magnetic island of the N magnetic islands of the first pillar. N is at least 2.

Step 62 determines a write current (I) sufficient to write the magnetization state [S1; S2] from a relationship (R) involving $\alpha_1^*$, $\alpha_2$, $H_1$, $H_2$, $\phi_1$ and $\phi_2$, wherein $H_1$ and $H_2$ respectively denote a magnetic field strength in the first magnetic island and the second magnetic island, wherein $\phi_1$ and $\phi_2$ respectively denote a magnetic field angle with respect to the X direction in the first magnetic island and the second magnetic island, wherein $\alpha_1^*$ and $\alpha_2^*$ are a first tilt angle and a second tilt angle at which a magnetic hard axis of the first magnetic island and the second magnetic island are respectively oriented with respect to the X direction, and wherein at least one tilt angle of the first tilt angle $\alpha_1^*$ and the second tilt angle $\alpha_2^*$ is between −90 and 0 degrees.

The magnetization state [S1; S2] is a state A=[+1,+1], a state B=[−1,−1], a state C=[+1,−1], or a state D=[−1,+1], wherein the magnetic state 51 is respectively +1 or −1 if a magnetization of the first magnetic island is oriented along its easy axis, at or opposite to the angle $\alpha_1$ with respect to the X direction, and wherein the magnetic state S2 is respectively +1 or −1 if a magnetization of the second magnetic island is oriented along its easy axis at or opposite to the angle $\alpha_2$ with respect to the X direction.

Step 63 applies the write current I to a magnetic write head moving in the X direction to generate in the first island and in the second island the magnetic fields $H_1$ and $H_2$ respectively, oriented at the field angle $\phi_1$ and $\phi_2$ respectively, resulting in writing the magnetization state [S1; S2] by simultaneously writing the magnetic state S1 in the first magnetic island and the magnetic state S2 in the second magnetic island.

The write current I will write the magnetization state [S1; S2] in the first and second island of the N islands as described supra for step 63. If N>2, the write current I may also write the remaining (N−2) islands of the N islands in a manner that depends on the magnetic properties of the remaining (N−2) islands of the N islands. In one embodiment, the remaining (N−2) islands are not being used and their magnetic states are of no concern while the magnetization state [S1; S2] is being written in the first and second islands, so that it does not matter in this embodiment what is specifically written in the remaining (N−2) islands. What may be written in the remaining (N−2) islands will contribute to the unique readback waveform of the magnetization state [S1; S2]. And this readback waveform will necessarily be different to the readback waveforms corresponding to the three other magnetization states.

Figure 12:
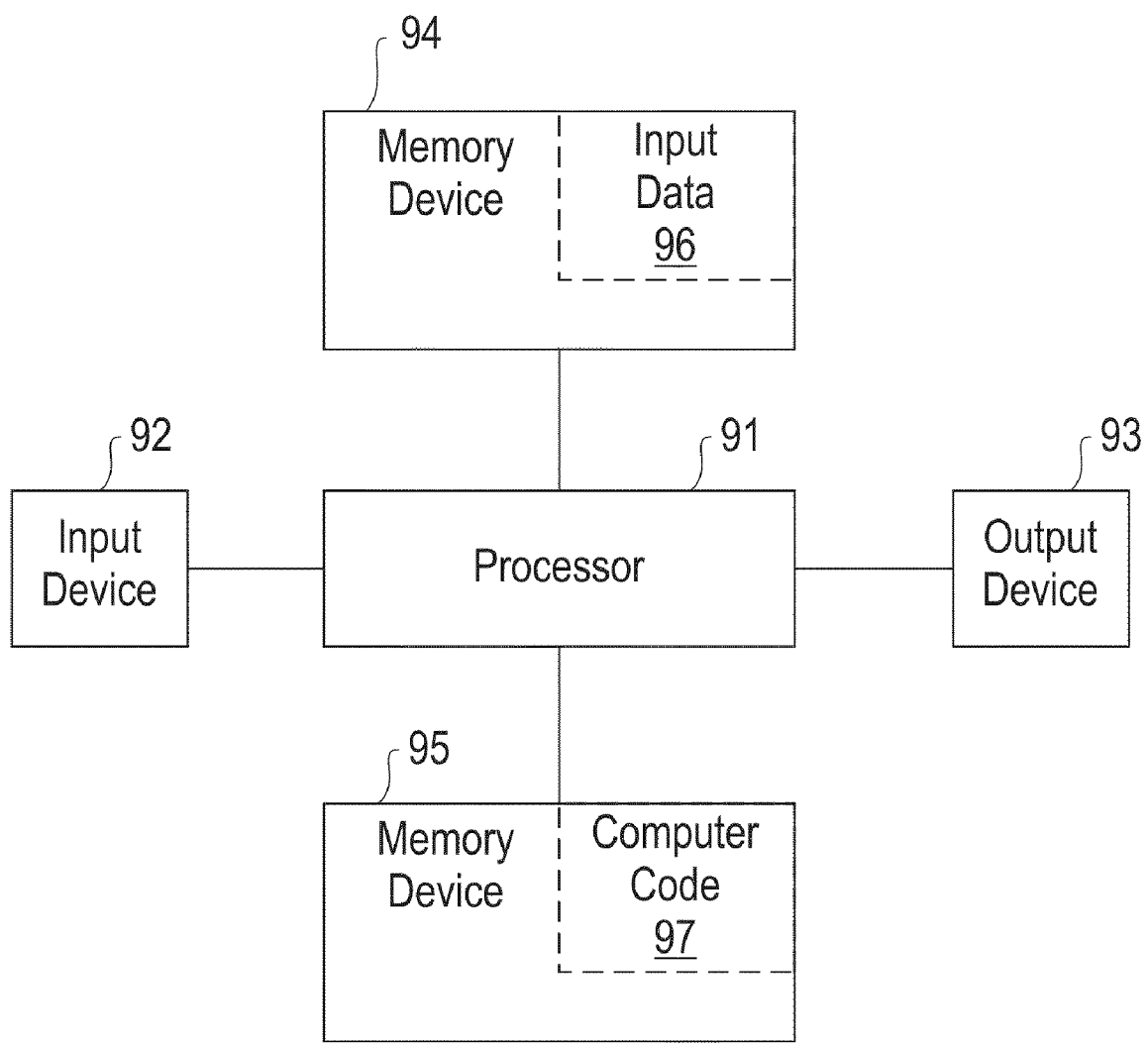
FIG. 12 illustrates a computer system used for executing software to implement the methodology of the present invention.

In one embodiment, steps 61-63 may be implemented in software via the computer system 90 of FIG. 12. The software executes selecting the magnetization state [S1; S2] in step 61, executes determining the write current I in step 62, and executes issuing a command for applying the write current I to the magnetic write head in step 63 which causes the magnetic write head to write the magnetization state [S1; S2] by simultaneously writing the magnetic state S1 in the first magnetic island and the magnetic state S2 in the second magnetic island.

Figure 11:
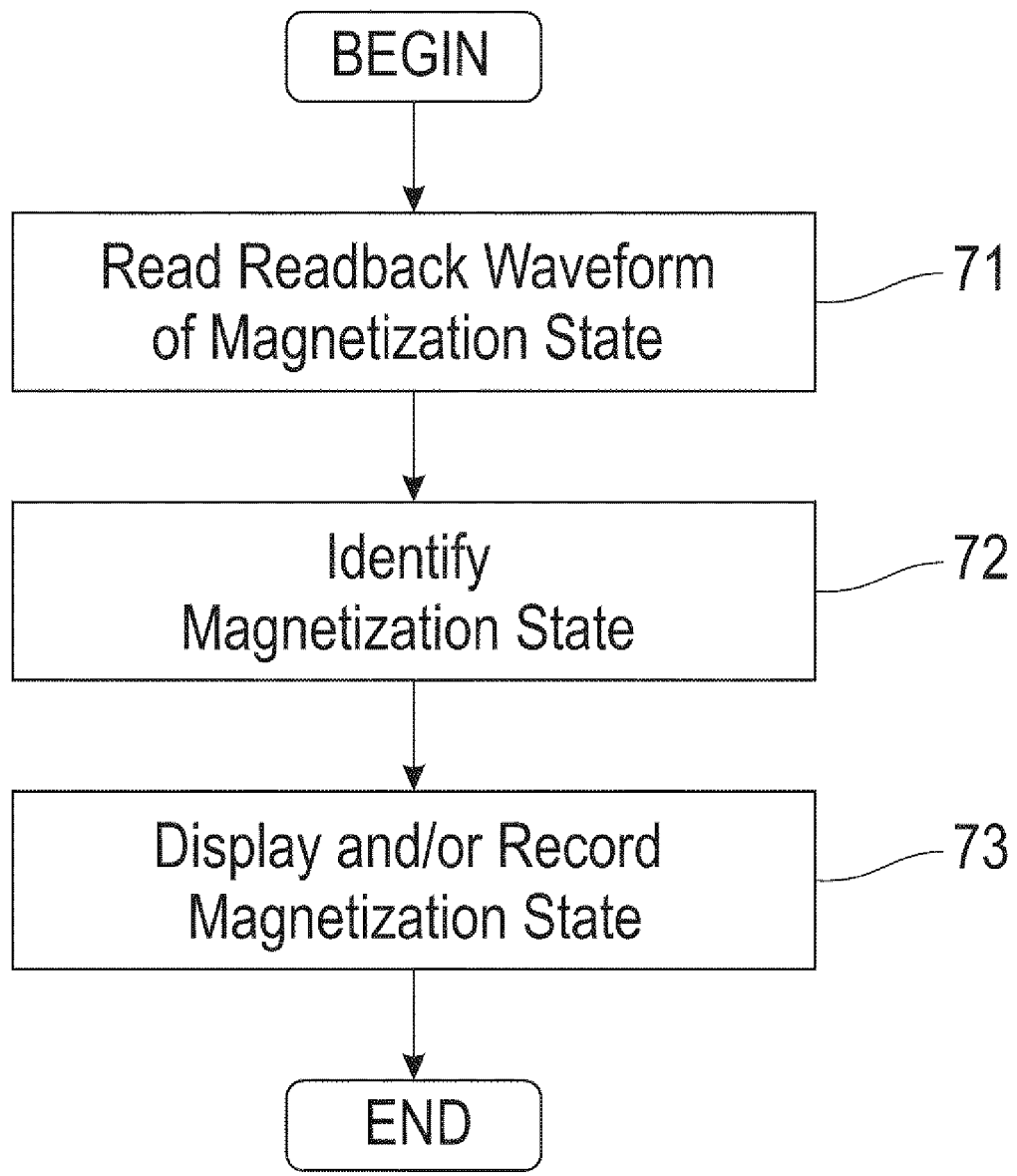
FIG. 11 is a flow chart of a method for reading magnetization states from a two-level patterned magnetic medium, in accordance with embodiments of the present invention.

FIG. 11 is a flow chart of a method for reading magnetization states from a two-level patterned magnetic medium, in accordance with embodiments of the present invention. The magnetic medium comprises a plurality of pillars distributed in a first and a second direction. Consecutive pillars of the plurality of pillars are separated by non-magnetic material. Each pillar comprises two magnetic islands distributed in a third direction orthogonal to the first and second directions. In one embodiment, the two magnetic islands in each pillar are separated by non-magnetic spacer material. The first, second, and third directions respectively correspond to the X, Y, and Z directions discussed supra with respect to FIG. 1. The method of FIG. 11 comprises steps 71-73.

Step 71 reads, by a magnetic read head moving in the X direction, a readback waveform (W) specific to a magnetization state [S1; S2] that comprises a magnetic state S1 in a first magnetic island of the two magnetic islands and a magnetic state S2 in a second magnetic island of the two magnetic islands of the first pillar. The first magnetic island and the second magnetic island have a magnetic easy axis respectively oriented at a first tilt angle ($\alpha_1$) and a second tilt angle ($\alpha_2$) with respect to the X direction, wherein $\alpha_1$ and $\alpha_2$ satisfy a condition selected from the group consisting of $\alpha_1 \neq \alpha_2$, either or both of $\alpha_1$ and $\alpha_2$ differing from 0, 90, 180, and 270 degrees, and combinations thereof. The first magnetic layer and the second magnetic layer have a magnetic hard axis respectively oriented at a first tilt angle ($\alpha_1^*$) and a second tilt angle ($\alpha_2^*$) with respect to the X direction. In one embodiment, at least one tilt angle of the two tilt angles ($\alpha_1^*$) and ($\alpha_2^*$) is between −90 and 0 degrees Step 72 decodes the readback waveform W from step 71 to identify the magnetization state [S1; S2] from the readback waveform W resulting from said reading.

Step 73 displays and/or records the magnetization state [S1; S2] identified in step 72. For example, the information state corresponding to the readback waveform W may be displayed on a display device of the computer system 12 of FIG. 12 and/or recorded (i.e., written) in a memory device of the computer system 90 of FIG. 12.

In one embodiment, steps 71-73 may be implemented in software via the computer system 90 of FIG. 12. In step 71, the software executes issuing a command for reading, by the magnetic read head, the readback waveform W (which causes the magnetic read head to read the readback waveform W). In step 72, the software decodes the readback waveform W to identify the magnetization state [S1; S2]. In step 73, the software executes displaying the magnetization state [S1; S2] identified in step 72.

FIG. 12 illustrates a computer system 90 used for executing software to implement the methodology of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be at least one of, inter alia, a printer, a plotter, a computer screen, a magnetic tape, a removable hard disk, a floppy disk, etc. The memory devices 94 and 95 may be at least one of, inter alia, a hard disk, a floppy disk, a magnetic tape, an optical storage such as a compact disc (CD) or a digital video disc (DVD), a random access memory (RAM), a dynamic random access memory (DRAM), a read-only memory (ROM), etc. The memory device 95 includes a computer code 97. The computer code 97 comprises software to implement the methodology of the present invention. The processor 91 executes the computer code 97. The memory device 94 includes input data 96. The input data 96 includes input required by the computer code 97. The output device 93 stores or displays output from the computer code 97. Either or both memory devices 94 and 95 (or one or more additional memory devices not shown in FIG. 12) may be used as a computer usable storage medium (or a computer readable storage medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable storage medium (or said program storage device).

In one embodiment, an apparatus of the present invention comprises the computer program product. In one embodiment, an apparatus of the present invention comprises the computer system such that the computer system comprises the computer program product.

While FIG. 12 shows the computer system 90 as a particular configuration of hardware and software, any configuration of hardware and software, as would be known to a person of ordinary skill in the art, may be utilized for the purposes stated supra in conjunction with the particular computer system 90 of FIG. 12. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for reading magnetization states from a two-level patterned magnetic medium comprising a plurality of pillars distributed in an X direction and a Y direction which are orthogonal to each other and define an X-Y plane, consecutive pillars of the plurality of pillars separated by nonmagnetic material, each pillar comprising two magnetic islands distributed along a Z direction orthogonal to the X-Y plane, said method comprising:

reading, by a magnetic read head moving in the X direction, a readback waveform (W) specific to a magnetization state [S1; S2] comprising a magnetic state (S1) and a magnetic state (S2) in a first magnetic island and in a second magnetic island, respectively, of the two magnetic islands of a selected pillar of the plurality of pillars, wherein magnetic states (S1) and (S2) are independent of each other, wherein the first magnetic island and the second magnetic island have a magnetic easy axis respectively oriented at a first tilt angle ($\alpha_1$) and a second tilt angle ($\alpha_2$) with respect to the X direction, wherein both $\alpha_1$ and $\alpha_2$ differ from 0, 90, 180, and 270 degrees, wherein the first magnetic island and the second magnetic island have a magnetic hard axis respectively oriented at a first tilt angle ($\alpha_1^*$) and a second tilt angle ($\alpha_2^*$) with respect to the X direction, and wherein $-90<\alpha_1^*<0$ and/or $-90<\alpha_2^*<0$;

identifying the magnetization state [S1; S2] by decoding the readback waveform W resulting from said reading; and displaying and/or recording the magnetization state [S1; S2], wherein the magnetization state [S1; S2] is a state A=[+1,+1], a state B=[−1,−1], a state C=[+1,−1], or a state D=[−1,+1], wherein the magnetic state S1 is respectively +1 or −1 if a magnetization of the first magnetic island is oriented at or opposite to the angle $\alpha_1$, and wherein the magnetic state S2 is respectively +1 or −1 if a magnetization of the second magnetic island is oriented at or opposite to the angle $\alpha_2$.

2. The method of claim 1, wherein $\alpha_1 \neq \alpha_2$.

3. The method of claim 1, wherein $-80 \leq \alpha_1^* \leq -10$ and either $-180<\alpha_2^*<-90$ or $-90<\alpha_2^*<0$.

4. The method of claim 1, wherein the displayed and/or recorded readback waveform W has a unique signature that is distinctive and distinguishable from a unique signature of a readback waveform specific to each other state of the states A, B, C, and D that differs from the state [S1; S2].

5. The method of claim 1, wherein the magnetization state [S1; S2] is generated by a magnetic write head moving in the X direction, said write head generating in the first pillar a magnetic field oriented at a field angle $\phi_1$ and $\phi_2$ with respect to the X direction in the first magnetic island and the second magnetic island, respectively;

wherein $\alpha_1$, $\alpha_2$, $\phi_1$, and $\phi_2$ satisfy a relationship (R) selected from the group consisting of a relationship R1a, a relationship R1b, a relationship R1c, a relationship R1d, a relationship R1e, a relationship R1f, a relationship R2a, a relationship R2b, a relationship R2c, a relationship R2d, a relationship R2e, and a relationship R2f;

wherein if [S1; S2] is A or B, then R is R1a, R1b, R1c, R1d, R1e, or R1f;

wherein if [S1; S2] is C or D, then R is R2a, R2b, R2c, R2d, R2e, or R2f;

said relationship R1a is $-80 \leq \alpha_1^* \leq -10$, $\alpha_1^*<\phi_1<0$, $-180<\alpha_2^*<-90$, $\alpha_2^*<\phi_2<0$;

said relationship R2a is $-80 \leq \alpha_1^* \leq -10$, $-90<\phi_1<\alpha_1^*$, $-180<\alpha_2^*<-90$, $\alpha_2^*<\phi_2<0$;

said relationship R1b is $-180<\alpha_1^*<-90$, $\alpha_1^*<\phi_1<0$, $-80 \leq \alpha_2^* \leq -10$, $\alpha_2^*<\phi_2<0$;

said relationship R2b is $-180<\alpha_1^*<-90$, $\alpha_1^*<\phi_1<0$, $-80 \leq \alpha_2^* \leq -10$, $-90<\phi_2<\alpha_2^*$;

said relationship R1c is $-80 \leq \alpha_1^* \leq -10$, $\alpha_1^*<\phi_1<0$, $-90<\alpha_2^*<0$, $\alpha_2^*<\phi_2<0$;

said relationship R2c is $-80 \leq \alpha_1^* \leq -10$, $-90<\phi_1<\alpha_1^*$, $-90<\alpha_2^*<0$, $\alpha_2^*<\phi_2<0$;

said relationship R1d is $-90<\alpha_1^*<0$, $\alpha_1^*<\phi_1<0$, $-80 \leq \alpha_2^* \leq -10$, $\alpha_2^*<\phi_2<0$;

said relationship R2d is $-90<\alpha_1^*<0$, $\alpha_1^*<\phi_1<0$, $-80 \leq \alpha_2^* \leq -10$, $-90<\phi_2<\alpha_2^*$;

said relationship R1e is $-80 \leq \alpha_1^* \leq -10$, $-90<\phi_1<\alpha_1^*$, $-90<\alpha_2^*<0$, $-90<\phi_2<\alpha_2^*$;

said relationship R2e is $-80 \leq \alpha_1^* \leq -10$, $-90<\phi_1<\alpha_1^*$, $-90<\alpha_2^*<0$, $\alpha_2^*<\phi_2<0$;

said relationship R1f is $-90<\alpha_1^*<0$, $-90<\phi_1<\alpha_1^*$, $-80 \leq \alpha_2^* \leq -10$, $-90<\phi_2<\alpha_2^*$;

said relationship R2f is $-90<\alpha_1^*<0$, $\alpha_1^*<\phi_1<0$, $-80 \leq \alpha_2^* \leq -10$, $-90<\phi_2<\alpha_2^*$.

6. A computer program product, said computer program product comprising a computer readable storage device having a computer readable program code stored therein, said computer readable program code containing instructions that when executed by a processor of a computer system implement a method for reading magnetization states from a two-level patterned magnetic medium comprising a plurality of pillars distributed in an X direction and a Y direction which are orthogonal to each other and define an X-Y plane, consecutive pillars of the plurality of pillars separated by nonmagnetic material, each pillar comprising two magnetic islands distributed along a Z direction orthogonal to the X-Y plane, said method comprising:

reading, by a magnetic read head moving in the X direction, a readback waveform (W) specific to a magnetization state [S1; S2] comprising a magnetic state (S1) and a magnetic state (S2) in a first magnetic island and in a second magnetic island, respectively, of the two magnetic islands of a selected pillar of the plurality of pillars, wherein magnetic states (S1) and (S2) are independent of each other, wherein the first magnetic island and the second magnetic island have a magnetic easy axis respectively oriented at a first tilt angle ($\alpha_1$) and a second tilt angle ($\alpha_2$) with respect to the X direction, wherein both $\alpha_1$ and $\alpha_2$ differ from 0, 90, 180, and 270 degrees, wherein the first magnetic island and the second magnetic island have a magnetic hard axis respectively oriented at a first tilt angle ($\alpha_1^*$) and a second tilt angle ($\alpha_2^*$) with respect to the X direction, and wherein $-90<\alpha_1^*<0$ and/or $-90<\alpha_2^*<0$;

identifying the magnetization state [S1; S2] by decoding the readback waveform W resulting from said reading; and displaying and/or recording the magnetization state [S1; S2], wherein the magnetization state [S1; S2] is a state A=[+1,+1], a state B=[−1,−1], a state C=[+1,−1], or a state D=[−1,+1], wherein the magnetic state S1 is respectively +1 or −1 if a magnetization of the first magnetic island is oriented at or opposite to the angle $\alpha_1$, and wherein the magnetic state S2 is respectively +1 or −1 if a magnetization of the second magnetic island is oriented at or opposite to the angle $\alpha_2$.

7. The computer program product of claim 6, wherein $\alpha_1 \neq \alpha_2$.

8. The computer program product of claim 6, wherein $-80 \leq \alpha_1^* \leq -10$ and either $-180 < \alpha_2^* < -90$ or $-90 < \alpha_2^* < 0$.

9. The computer program product of claim 6, wherein the displayed and/or recorded readback waveform W has a unique signature that is distinctive and distinguishable from a unique signature of a readback waveform specific to each other state of the states A, B, C, and D that differs from the state [S1; S2].

10. The computer program product of claim 6,
wherein the magnetization state [S1; S2] is generated by a magnetic write head moving in the X direction, said write head generating in the first pillar a magnetic field oriented at a field angle $\phi_1$ and $\phi_2$ with respect to the X direction in the first magnetic island and the second magnetic island, respectively;
wherein $\alpha_1$, $\alpha_2$, $\phi_1$, and $\phi_2$ satisfy a relationship (R) selected from the group consisting of a relationship R1$a$, a relationship R1$b$, a relationship R1$c$, a relationship R1$d$, a relationship R1$e$, a relationship R1$f$, a relationship R2$a$, a relationship R2$b$, a relationship R2$c$, a relationship R2$d$, a relationship R2$e$, and a relationship R2$f$;
wherein if [S1; S2] is A or B, then R is R1$a$, R1$b$, R1$c$, R1$d$, R1$e$, or R1$f$;
wherein if [S1; S2] is C or D, then R is R2$a$, R2$b$, R2$c$, R2$d$, R2$e$, or R2$f$;
said relationship R1$a$ is $-80 \leq \alpha_1^* \leq -10$, $\alpha_1^* < \phi_1 < 0$, $-180 < \alpha_2^* < -90$, $\alpha_2^* < \phi_2 < 0$;
said relationship R2$a$ is $-80 \leq \alpha_1^* \leq -10$, $-90 < \phi_1 < \alpha_1^*$, $-180 < \alpha_2^* < -90$, $\alpha_2^* < \phi_2 < 0$;
said relationship R1$b$ is $-180 < \alpha_1^* < -90$, $\alpha_1^* < \phi_1 < 0$, $-80 \leq \alpha_2^* \leq -10$, $\alpha_2^* < \phi_2 < 0$;
said relationship R2$b$ is $-180 < \alpha_1^* < -90$, $\alpha_1^* < \phi_1 < 0$, $-80 \leq \alpha_2^* \leq -10$, $-90 < \phi_2 < \alpha_2^*$;
said relationship R1$c$ is $-80 \leq \alpha_1^* \leq -10$, $\alpha_1^* < \phi_1 < 0$, $-90 < \alpha_2^* < 0$, $\alpha_2^* < \phi_2 < 0$;
said relationship R2$c$ is $-80 \leq \alpha_1^* \leq -10$, $-90 < \phi_1 < \alpha_1^*$, $-90 < \alpha_2^* < 0$, $\alpha_2^* < \phi_2 < 0$;
said relationship R1$d$ is $-90 < \alpha_1^* < 0$, $\alpha_1^* < \phi_1 < 0$, $-80 \leq \alpha_2^* \leq -10$, $\alpha_2^* < \phi_2 < 0$;
said relationship R2$d$ is $-90 < \alpha_1^* < 0$, $\alpha_1^* < \phi_1 < 0$, $-80 \leq \alpha_2^* \leq -10$, $-90 < \phi_2 < \alpha_2^*$;
said relationship R1$e$ is $-80 \leq \alpha_1^* \leq -10$, $-90 < \phi_1 < \alpha_1^*$, $-90 < \alpha_2^* < 0$, $-90 < \phi_2 < \alpha_2^*$;
said relationship R2$e$ is $-80 \leq \alpha_1^* \leq -10$, $-90 < \phi_1 < \alpha_1^*$, $-90 < \alpha_2^* < 0$, $\alpha_2^* < \phi_2 < 0$;
said relationship R1$f$ is $-90 < \alpha_1^* < 0$, $-90 < \phi_1 < \alpha_1^*$, $-80 \leq \alpha_2^* \leq -10$, $-90 < \phi_2 < \alpha_2^*$;
said relationship R2$f$ is $-90 < \alpha_1^* < 0$, $\alpha_1^* < \phi_1 < 0$, $-80 \leq \alpha_2^* \leq -10$, $-90 < \phi_2 < \alpha_2^*$.

11. A computer system comprising a processor and a computer readable memory unit coupled to the processor, said memory unit containing instructions configured to be executed by the processor to implement a method for reading magnetization states from a two-level patterned magnetic medium comprising a plurality of pillars distributed in an X direction and a Y direction which are orthogonal to each other and define an X-Y plane, consecutive pillars of the plurality of pillars separated by non-magnetic material, each pillar comprising two magnetic islands distributed along a Z direction orthogonal to the X-Y plane, said method comprising:
reading, by a magnetic read head moving in the X direction, a readback waveform (W) specific to a magnetization state [S1; S2] comprising a magnetic state (S1) and a magnetic state (S2) in a first magnetic island and in a second magnetic island, respectively, of the two magnetic islands of a selected pillar of the plurality of pillars, wherein magnetic states (S1) and (S2) are independent of each other, wherein the first magnetic island and the second magnetic island have a magnetic easy axis respectively oriented at a first tilt angle ($\alpha_1$) and a second tilt angle ($\alpha_2$) with respect to the X direction, wherein both $\alpha_1$ and $\alpha_2$ differ from 0, 90, 180, and 270 degrees, wherein the first magnetic island and the second magnetic island have a magnetic hard axis respectively oriented at a first tilt angle ($\alpha_1^*$) and a second tilt angle ($\alpha_2^*$) with respect to the X direction, and wherein $-90 < \alpha_1^* < 0$ and/or $-90 < \alpha_2^* < 0$;
identifying the magnetization state [S1; S2] by decoding the readback waveform W resulting from said reading; and
displaying and/or recording the magnetization state [S1; S2],
wherein the magnetization state [S1; S2] is a state A=[+1,+1], a state B=[−1,−1], a state C=[+1,−1], or a state D=[−1,+1], wherein the magnetic state S1 is respectively +1 or −1 if a magnetization of the first magnetic island is oriented at or opposite to the angle $\alpha_1$, and wherein the magnetic state S2 is respectively +1 or −1 if a magnetization of the second magnetic island is oriented at or opposite to the angle $\alpha_2$.

12. The computer system of claim 11, wherein $\alpha_1 \neq \alpha_2$.

13. The computer system of claim 11, wherein $-80 \leq \alpha_1^* \leq -10$ and either $-180 < \alpha_2^* < -90$ or $-90 < \alpha_2^* < 0$.

14. The computer system of claim 11, wherein the displayed and/or recorded readback waveform W has a unique signature that is distinctive and distinguishable from a unique signature of a readback waveform specific to each other state of the states A, B, C, and D that differs from the state [S1; S2].

15. The computer system of claim 11, wherein the magnetization state [S1; S2] is generated by a magnetic write head moving in the X direction, said write head generating in the first pillar a magnetic field oriented at a field angle $\phi_1$ and $\phi_2$ with respect to the X direction in the first magnetic island and the second magnetic island, respectively;
wherein $\alpha_1$, $\alpha_2$, $\phi_1$, and $\phi_2$ satisfy a relationship (R) selected from the group consisting of a relationship R1$a$, a relationship R1$b$, a relationship R1$c$, a relationship R1$d$, a relationship R1$e$, a relationship R1$f$, a relationship R2$a$, a relationship R2$b$, a relationship R2$c$, a relationship R2$d$, a relationship R2$e$, and a relationship R2$f$;
wherein if [S1; S2] is A or B, then R is R1$a$, R1$b$, R1$c$, R1$d$, R1$e$, or R1$f$;
wherein if [S1; S2] is C or D, then R is R2$a$, R2$b$, R2$c$, R2$d$, R2$e$, or R2$f$;
said relationship R1$a$ is $-80 \leq \alpha_1^* \leq -10$, $\alpha_1^* < \phi_1 < 0$, $-180 < \alpha_2^* < -90$, $\alpha_2^* < \phi_2 < 0$;
said relationship R2$a$ is $-80 \leq \alpha_1^* \leq -10$, $-90 < \phi_1 < \alpha_1^*$, $-180 < \alpha_2^* < -90$, $\alpha_2^* < \phi_2 < 0$;
said relationship R1$b$ is $-180 < \alpha_1^* < -90$, $\alpha_1^* < \phi_1 < 0$, $-80 \leq \alpha_2^* \leq -10$, $\alpha_2^* < \phi_2 < 0$;
said relationship R2$b$ is $-180 < \alpha_1^* < -90$, $\alpha_1^* < \phi_1 < 0$, $-80 \leq \alpha_2^* \leq -10$, $-90 < \phi_2 < \alpha_2^*$;
said relationship R1$c$ is $-80 \leq \alpha_1^* \leq -10$, $\alpha_1^* < \phi_1 < 0$, $-90 < \alpha_2^* < 0$, $\alpha_2^* < \phi_2 < 0$;
said relationship R2$c$ is $-80 \leq \alpha_1^* \leq -10$, $-90 < \phi_1 < \alpha_1^*$, $-90 < \alpha_2^* < 0$, $\alpha_2^* < \phi_2 < 0$;
said relationship R1$d$ is $-90 < \alpha_1^* < 0$, $\alpha_1^* < \phi_1 < 0$, $-80 \leq \alpha_2^* \leq -10$, $\alpha_2^* < \phi_2 < 0$;
said relationship R2$d$ is $-90 < \alpha_1^* < 0$, $\alpha_1^* < \phi_1 < 0$, $-80 \leq \alpha_2^* \leq -10$, $-90 < \phi_2 < \alpha_2^*$;
said relationship R1$e$ is $-80 \leq \alpha_1^* \leq -10$, $-90 < \phi_1 < \alpha_1^*$, $-90 < \alpha_2^* < 0$, $-90 < \phi_2 < \alpha_2^*$;

said relationship R2e is $-80 \leq \alpha_1^* \leq -10$, $-90 < \phi_1 < \alpha_1^*$, $-90 < \alpha_2^* < 0$, $\alpha_2^* < \phi_2 < 0$;

said relationship R1f is $-90 < \alpha_1^* < 0$, $-90 < \phi_1 < \alpha_1^*$, $-80 \leq \alpha_2^* \leq -10$, $-90 < \phi_2 < \alpha_2^*$;

said relationship R2f is $-90 < \alpha_1^* < 0$, $\alpha_1^* < \phi_1 < 0$, $-80 \leq \alpha_2^* \leq -10$, $-90 < \phi_2 < \alpha_2^*$.

16. A structure comprising a multi-level patterned magnetic medium comprising a plurality of pillars distributed in an X direction and a Y direction which are orthogonal to each other and define an X-Y plane, wherein consecutive pillars of the plurality of pillars are separated by non-magnetic material, wherein each pillar comprises N magnetic islands distributed along a Z direction orthogonal to the X-Y plane, wherein N is an integer of at least 2, wherein the N magnetic islands of a first pillar of the plurality of pillars comprise a first magnetic island and a second magnetic island, wherein the first magnetic island and the second magnetic island have a magnetic easy axis respectively oriented at a first tilt angle ($\alpha_1$) and a second tilt angle ($\alpha_2$) with respect to the X direction, wherein both $\alpha_1$ and $\alpha_2$ differ from 0, 90, 180, and 270 degrees, wherein the first magnetic island and the second magnetic island have a magnetic hard axis respectively oriented at a first tilt angle ($\alpha_1^*$) and a second tilt angle ($\alpha_2^*$) with respect to the X direction, and wherein $-90 < \alpha_1^* < 0$ and/or $-90 < \alpha_2^* < 0$;

wherein the structure comprises a magnetization state [S1; S2] consisting of a magnetic state (S1) in the first magnetic island and a magnetic state (S2) in the second magnetic island;

wherein magnetic states (S1) and (S2) are independent of each other;

wherein the magnetic state S1 is respectively +1 or −1 if a magnetization of the first magnetic island is oriented at or opposite to the angle $\alpha_1$;

wherein the magnetic state S2 is respectively +1 or −1 if a magnetization of the second magnetic island is oriented at or opposite to the angle $\alpha_2$;

wherein the magnetization state [S1; S2] is a state A=[+1,+1], a state B=[−1,−1], a state C=[+1,−1], or a state D=[−1,+1].

17. The structure of claim 16, wherein $\alpha_1 \neq \alpha_2$.

18. The structure of claim 16, wherein $-80 \leq \alpha_1^* \leq -10$ and either $-180 < \alpha_2^* < -90$ or $-90 < \alpha_2^* < 0$.

19. The structure of claim 16, wherein the magnetization state [S1; S2] was written by a magnetic field in the first island and the second island having a magnetic field strength of $H_1$ and $H_2$ and oriented at a field angle $\phi_1$ and $\phi_2$ with respect to the X direction in the first magnetic island and the second magnetic island, respectively wherein the first magnetic island and the second magnetic island have a switching field $H_{sw,1}(\phi_1)$ and $H_{sw,2}(\phi_2)$, respectively;

wherein $\alpha_1, \alpha_2, H_1, H_2, \phi_1$, and $\phi_2$ satisfy a relationship (R) selected from the group consisting of a relationship R1a, a relationship R1b, a relationship R1c, a relationship R1d, a relationship R1e, a relationship R1f, a relationship R2a, a relationship R2b, a relationship R2c, a relationship R2d, a relationship R2e, and a relationship R2f;

wherein if [S1; S2] is A or B, then R is R1a, R1b, R1c, R1d, R1e, or R1f;

wherein if [S1; S2] is C or D, then R is R2a, R2b, R2c, R2d, R2e, or R2f;

said relationship R1a is $-80 \leq \alpha_1^* \leq -10$, $\alpha_1^* < \phi_1 < 0$, $H_1 \geq H_{sw,1}(\phi_1)$, $-180 < \alpha_2^* < -90$, $\alpha_2^* < \phi_2 < 0$, $H_2 \geq H_{sw,2}(\phi_2)$;

said relationship R2a is $-80 \leq \alpha_1^* \leq -10$, $-90 < \phi_1 < \alpha_1^*$, $H_1 \geq H_{sw,1}(\phi_1)$, $-180 < \alpha_2^* < -90$, $\alpha_2^* < \phi_2 < 0$, $H_2 \geq H_{sw,2}(\phi_2)$;

said relationship R1b is $-180 < \alpha_1^* < -90$, $\alpha_1^* < \phi_1 < 0$, $H_1 \geq H_{sw,1}(\phi_1)$, $-80 \leq \alpha_2^* \leq -10$, $\alpha_2^* < \phi_2 < 0$, $H_2 \geq H_{sw,2}(\phi_2)$;

said relationship R2b is $-180 < \alpha_1^* < -90$, $\alpha_1^* < \phi_1 < 0$, $H_1 \geq H_{sw,1}(\phi_1)$, $-80 \leq \alpha_2^* \leq -10$, $-90 < \phi_2 < \alpha_2^*$, $H_2 \geq H_{sw,2}(\phi_2)$;

said relationship R1c is $-80 \leq \alpha_1^* \leq -10$, $\alpha_1^* < \phi_1 < 0$, $H_1 \geq H_{sw,1}(\phi_1)$, $-90 < \alpha_2^* < 0$, $\alpha_2^* < \phi_2 < 0$, $H_2 \geq H_{sw,2}(\phi_2)$;

said relationship R2c is $-80 \leq \alpha_1^* \leq -10$, $-90 < \phi_1 < \alpha_1^*$, $H_1 \geq H_{sw,1}(\phi_1)$, $-90 < \alpha_2^* < 0$, $\alpha_2^* < \phi_2 < 0$, $H_2 \geq H_{sw,2}(\phi_2)$;

said relationship R1d is $-90 < \alpha_1^* < 0$, $\alpha_1^* < \phi_1 < 0$, $H_1 \geq H_{sw,1}(\phi_1)$, $-80 \leq \alpha_2^* \leq -10$, $\alpha_2^* < \phi_2 < 0$, $H_2 \geq H_{sw,2}(\phi_2)$;

said relationship R2d is $-90 < \alpha_1^* < 0$, $\alpha_1^* < \phi_1 < 0$, $H_1 \geq H_{sw,1}(\phi_1)$, $-80 \leq \alpha_2^* \leq -10$, $-90 < \phi_2 < \alpha_2^*$, $H_2 \geq H_{sw,2}(\phi_2)$;

said relationship R1e is $-80 \leq \alpha_1^* \leq -10$, $-90 < \phi_1 < \alpha_1^*$, $H_1 \geq H_{sw,1}(\phi_1)$, $-90 < \alpha_2^* < 0$, $-90 < \phi_2 < \alpha_2^*$, and $H_2 \geq H_{sw,2}(\phi_2)$;

said relationship R2e is $-80 \leq \alpha_1^* \leq -10$, $-90 < \phi_1 < \alpha_1^*$, $H_1 \geq H_{sw,1}(\phi_1)$, $-90 < \alpha_2^* < 0$, $\alpha_2^* < \phi_2 < 0$, $H_2 \geq H_{sw,2}(\phi_2)$;

said relationship R1f is $-90 < \alpha_1^* < 0$, $-90 < \phi_1 < \alpha_1^*$, $H_1 \geq H_{sw,1}(\phi_1)$, $-80 \leq \alpha_2^* \leq -10$, $-90 < \phi_2 < \alpha_2^*$, $H_2 \geq H_{sw,2}(\phi_2)$;

said relationship R2f is $-90 < \alpha_1^* < 0$, $\alpha_1^* < \phi_1 < 0$, $H_1 \geq H_{sw,1}(\phi_1)$, $-80 \leq \alpha_2^* \leq -10$, $-90 < \phi_2 < \alpha_2^*$, $H_2 \geq H_{sw,2}(\phi_2)$.

* * * * *